United States Patent [19]
Hiroi et al.

[11] Patent Number: 5,927,706
[45] Date of Patent: *Jul. 27, 1999

[54] AUTOMATIC ORIGINAL SUPPLYING APPARATUS

[75] Inventors: Masakazu Hiroi, Kawasaki; Kazuhiro Matsuo, Kashiwa; Haruo Naruse, Kawasaki; Takuya Terae, Hino, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,148

[22] Filed: Sep. 30, 1996

[30] Foreign Application Priority Data

Sep. 29, 1995 [JP] Japan ................................... 7-253035
Oct. 13, 1995 [JP] Japan ................................... 7-266043
Oct. 13, 1995 [JP] Japan ................................... 7-266050

[51] Int. Cl.⁶ .................................................. B65H 3/06
[52] U.S. Cl. ...................... 271/117; 271/3.01; 271/9.11; 271/122; 271/124; 271/125
[58] Field of Search ................... 271/3.01, 3.03, 271/3.05, 3.06, 34, 122, 124, 125, 117, 9.02, 9.11; 399/373, 365

[56] References Cited

U.S. PATENT DOCUMENTS

| | | |
|---|---|---|
| 3,702,697 | 11/1972 | Leutwein et al. .................... 271/3.06 |
| 3,753,559 | 8/1973 | Ries et al. ............................... 271/3.01 |
| 4,674,734 | 6/1987 | Ibuchi ........................................ 271/34 |
| 4,822,023 | 4/1989 | Miyoshi .................................. 271/122 |
| 5,132,741 | 7/1992 | Kitajima et al. ........................ 271/3.06 |
| 5,203,846 | 4/1993 | Kuhns et al. ............................ 271/125 |
| 5,339,134 | 8/1994 | Nakamura et al. ..................... 271/3.01 |

Primary Examiner—H. Grant Skaggs
Attorney, Agent, or Firm—Fitpatrick, Cella, Harper & Scinto

[57] ABSTRACT

The present invention provides an automatic original supplying apparatus in which originals are stacked on an original tray as an original bundle and the originals in the original bundle are separated one by one from an uppermost one or from a lowermost one by a separation portion disposed at one side of the original tray. The apparatus comprises a guide passage for directing the original bundle to the separation portion, and a guide member provided at a tip end of the guide passage for upward and downward pivotal movement so that, when the originals are separated from the uppermost one, the guide member is rocked upwardly to protrude upwardly from the guide passage in an inclined fashion to thereby push a tip end of the original bundle to be directed to said separation portion, and, when the originals are separated from the lowermost one, the guide member is rocked downwardly to be retarded from the guide passage.

32 Claims, 18 Drawing Sheets

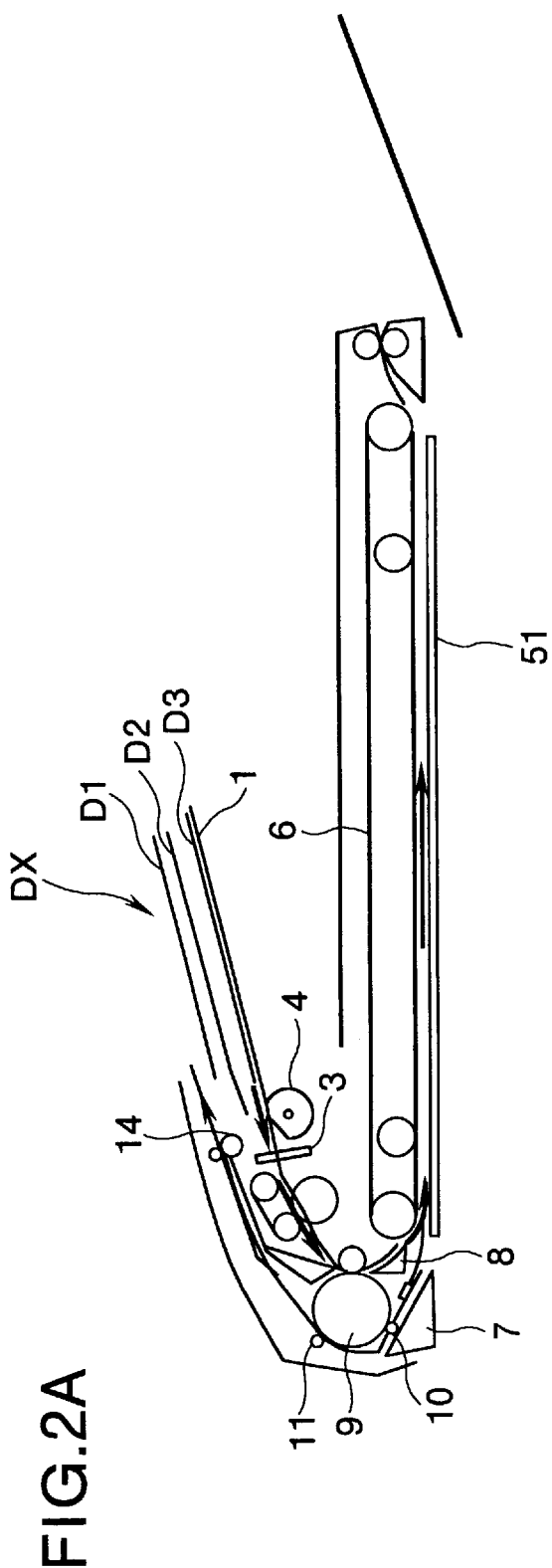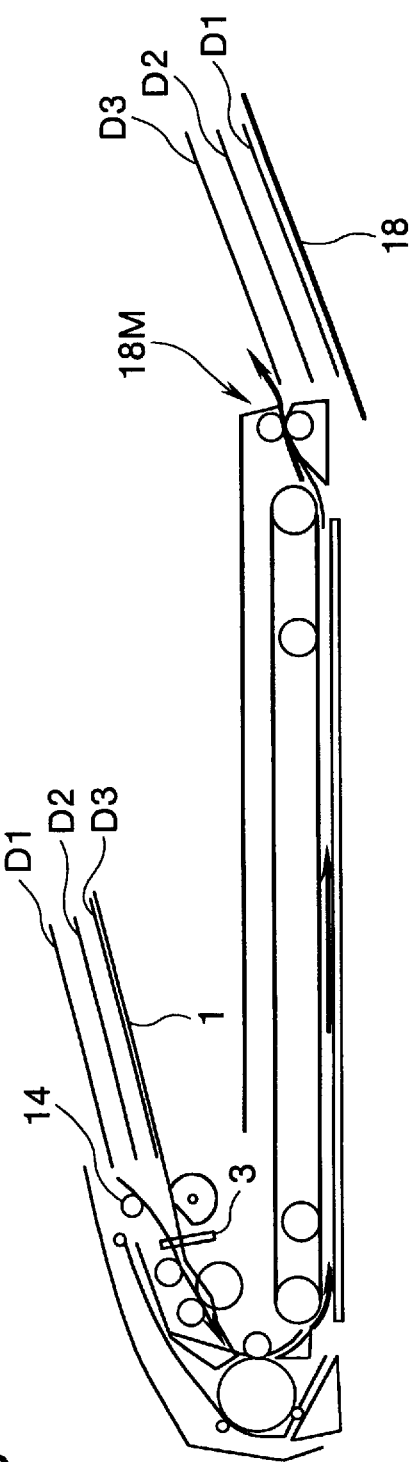
FIG.2A
FIG.2B

LOWER SEPARATION

UPPER SEPARATION

AUTOMATIC ORIGINAL SUPPLYING APPARATUS

BACKGROUND OF THE INVENTION

1. Field of the Invention

The present invention relates to an automatic original supplying apparatus in which upper separation and lower separation can be performed selectively, and more particularly, it relates to an automatic sheet supplying apparatus used in an original processing apparatus for successively supplying originals to an image forming apparatus having both a facsimile function and an original copying function, and an image forming apparatus for forming an image on a sheet supplied by the automatic sheet supplying apparatus.

2. Related Background Art

In the past, a page sequence for processing an original bundle was different between in a facsimile mode and an original copying mode. That is to say, in the facsimile mode, the originals were successively supplied from a first page so that a receiver can read the originals from the first page, and, in the copying mode, the originals were successively copied from a last page so that the copies are stacked in the same page sequence as that of the originals.

However, recently, composite machines of digital type including a facsimile function and a copying function has been developed. In such composite machines, either of the following arrangements was required for processing originals and for effecting first page supply in a facsimile mode and last page supply in a copying mode.

First of all, as a first arrangement, there is a system as shown in FIG. 15, which will be described hereinbelow. In FIG. 15, an upper block indicated by the two-dot and chain line schematically shows a conventional original processing apparatus, and a lower block indicated by the two-dot and chain line schematically shows a composite image forming apparatus of digital type (including a facsimile function and a copying function). In this system, in order to avoid operator's handling trouble, originals are stacked with imaged surfaces thereof facing upside (referred to as "face-up" hereinafter) both in a facsimile mode and in a copy mode so that the originals to be read are successively supplied to the image forming apparatus from a last page. In the copy mode, the originals are successively copied in the reverse page sequence (i.e. from the last page), and in the facsimile mode, after information regarding all pages is stored in a memory temporarily, the information is successively transmitted from a first page. Now, such operation will be explained with reference to FIG. 15.

First of all, the originals $D_1$ to be processed are stacked on an original tray 201 in the face-up fashion both in the facsimile mode and in the copy mode. The original bundle $D_1$ is urged against a pick-up roller 215 by a weight roller 202, so that the originals are supplied one by one from a lowermost one by means of the pick-up roller. A pre-separation plate 216 serves to prevent the double-feed of originals. A pair of rollers (comprised of a feed roller 204 and a retard roller 203 to which a driving force can be transmitted through a torque limiter (not shown)) serve to separate and convey the originals one by one in a retard fashion. A pair of regist rollers 205a, 205b serve to convey the original onto an original glass platen 209 in a timed relation. An original convey belt 208 is supported by a belt drive roller 207 and an idler roller 206 so that the belt is rotated in a direction shown by the arrow. The original convey belt 208 serves to temporarily stop the original at a predetermined position on the original glass platen 209. At this point, a scanner unit 210 comprising a halogen lamp 210a, a reflection bond 210b and a reflection mirror 210c is shifted to expose the original; meanwhile image information on the original is read by an arrow of CCD sensors 210 arranged side by side across a maximum width of the original.

In the facsimile mode, after the read information is temporarily stored in a memory 230, the information is rearranged from the first page to the last page, and the rearranged information is transmitted. In the copy mode, the read information is directly sent to a laser driver 240 without through the memory, and latent images are successively formed on a photosensitive drum (not shown) in the reverse page sequence.

The originals which were read are successively discharged and stacked on an original discharge tray 212 by the original convey belt 208 and a convey roller 211.

Other than the above-mentioned arrangement, there may be provided an original tray for the facsimile mode and an original tray for the copy mode so that the originals stacked on the facsimile tray are successively supplied from an uppermost one and the originals stacked on the copy tray are successively supplied from a lowermost one.

However, regarding the above-mentioned conventional cases, in case of the first arrangement (in the facsimile mode, after all information is temporarily stored in the memory, the information is transmitted from the first page), an expensive and large capacity memory is required, and the transmission cannot be performed immediately after of the reading of the original to cause the great time lag.

In case of the second arrangement (provision of facsimile tray and copy tray), two separation and convey means are required, thereby making the entire system complicated, bulky and expensive.

SUMMARY OF THE INVENTION

The present invention aims to eliminate the above-mentioned conventional drawbacks, and has an object to provide an apparatus in which sheets can stably be separated one by one both from an uppermost one and from a lowermost one.

To achieve the above object, according to the present invention, there is provided an automatic original supplying apparatus in which originals are stacked on an original tray as an original bundle and the originals in the original bundle are separated one by one from an uppermost one or from a lowermost one by a separation portion disposed at one side of the original tray. It comprises a guide passage for directing the original bundle to the separation portion, and a guide member provided at a tip end of the guide passage for upward and downward pivotal movement so that, when the originals are separated from the uppermost one, the guide member is rocked upwardly to protrude upwardly from the guide passage in an inclined fashion thereby to push a tip end of the original bundle to be directed to the separation portion, and, when the originals are separated from the lowermost one, the guide member is rocked downwardly to be retarded from the guide passage.

More particularly, the separation portion comprises a pair of upper and lower rotary members which are moved toward each other in the upper separation and are moved away from each other in the lower separation and a pair of upper and lower rotary members which are moved away from each other in the upper separation and are moved toward each other in the lower separation.

The rocking position of the guide member is determined by the shifting movements of the rotary members.

Still more particularly, the separation portion comprises a reversible separation/supply rotary member which can be rotated in a normal or a reverse direction in response to a normal or a reverse rotation of a motor, and the rocking direction of the guide member is determined by the rotational direction of the motor.

Further, the present invention provides an automatic original supplying apparatus in which originals are stacked on an original tray as an original bundle and the originals in the original bundle are separated one by one from an uppermost one or from a lowermost one by a separation portion disposed at one side of the original tray. It comprises a guide passage for directing the original bundle to the separation portion, and an original separation aiding member provided at a tip end of the guide passage for upward and downward pivotal movement so that, when the originals are separated from the uppermost one, the aiding member is rocked upwardly to be retarded from the guide passage, and, when the originals are separated from the lowermost one, the aiding member is rocked downwardly to protrude downwardly from the guide passage in an inclined fashion thereby to handle the original bundle.

With the arrangement as mentioned above, when the originals are separated from the uppermost one, the guide member provided at the tip end of the guide passage (for directing the original bundle to the separation portion) for upward and downward pivotal movement is rocked upwardly to protrude upwardly from the guide passage in the inclined fashion to abut the guide member against the surface of the original bundle to be directed to the separation portion, thereby causing deviation of the originals in the original bundle. Further, by setting so that a coefficient of friction between the guide member and the original bundle becomes greater than a coefficient of friction between the originals, the originals in the original bundle can be deviated one by one from the uppermost one, thereby achieving the proper pre-separation effect. On the other hand, when the originals are separated from the lowermost one, the guide member is rocked downwardly to retard it from the guide passage, so that the original bundle can be moved without abutting against the guide member, thereby minimizing the convey load in the separation/supply operation.

Further, the guide passage for directing the original bundle to the separation portion includes a pair of upper and lower guide members which can be rocked so that, when the originals are separated from the uppermost one, by rocking the upper guide member downwardly, the upper pre-separation member is retarded from the guide passage and the lower pre-separation member alone is protruded into the guide passage thereby to cause the deviation of the originals in the original bundle directed to the separation portion. On the other hand, when the originals are separated from the lowermost one, by rocking the lower guide member upwardly, the lower pre-separation member is retarded from the guide passage and the upper pre-separation member alone is protruded into the guide passage.

As mentioned above, according to the present invention, by using only one separation portion, the upper separation in which the originals in the original bundle are separated from the uppermost one or the lower separation in which the originals in the original bundle are separated from the lowermost one can be selected and performed, thereby providing the original processing apparatus suitable for both the copying function and the facsimile function.

According to the present invention, when the originals are separated from the uppermost one, the pre-separation member provided at the tip end of the guide passage is rocked upwardly to cause the deviation of the originals in the original bundle, and by setting so that the coefficient of friction between the pre-separation member and the original bundle becomes greater than the coefficient of friction between the originals, the originals in the original bundle can be deviated one by one from the uppermost one, thereby achieving the proper pre-separation effect. On the other hand, when the originals are separated from the lowermost one, the pre-separation member is rocked downwardly to retard it from the guide passage, so that the original bundle can be moved without abutting against the pre-separation member, thereby minimizing the convey load in the separation/supply operation.

Further, since the guide passage includes a pair of upper and lower pre-separation members so that when the originals are separated from the uppermost one the lower pre-separation member alone is protruded into the guide passage and when the originals are separated from the lowermost one the upper pre-separation member alone is protruded into the guide passage, the proper pre-separation effect can be achieved.

By realizing the proper pre-separation effect, the original can surely be separated from the original bundle, whereby ensuring more stable separation/supply ability. Further, since the stable separation mechanism enabling the upper separation and the lower separation can be obtained with a simple construction, a cheaper copying machine (having a copying function and a facsimile function) can be provided.

According to the present invention, since the separation portion includes the original separation aiding member, when the originals in the original bundle are separated from the lowermost one, the original separation aiding member is urged against the original bundle before separation to cause the deviation of the originals in the original bundle, thereby reducing the separation pressure to prevent the smudge of the originals. On the other hand, when the originals in the original bundle are separated from the uppermost one, the original separation aiding member is retarded from between the rotary member and the original separation rotary member not to abut against the original bundle, thereby eliminating the supply resistance and permitting the stable original conveying operation.

BRIEF DESCRIPTION OF THE DRAWINGS

FIGS. 2A and 2B are views for explaining original conveyance of the automatic original supplying apparatus;

DETAILED DESCRIPTION OF THE PREFERRED EMBODIMENTS

The present invention will now be explained in connection with embodiments thereof with reference to the accompanying drawings.

Figure 1:
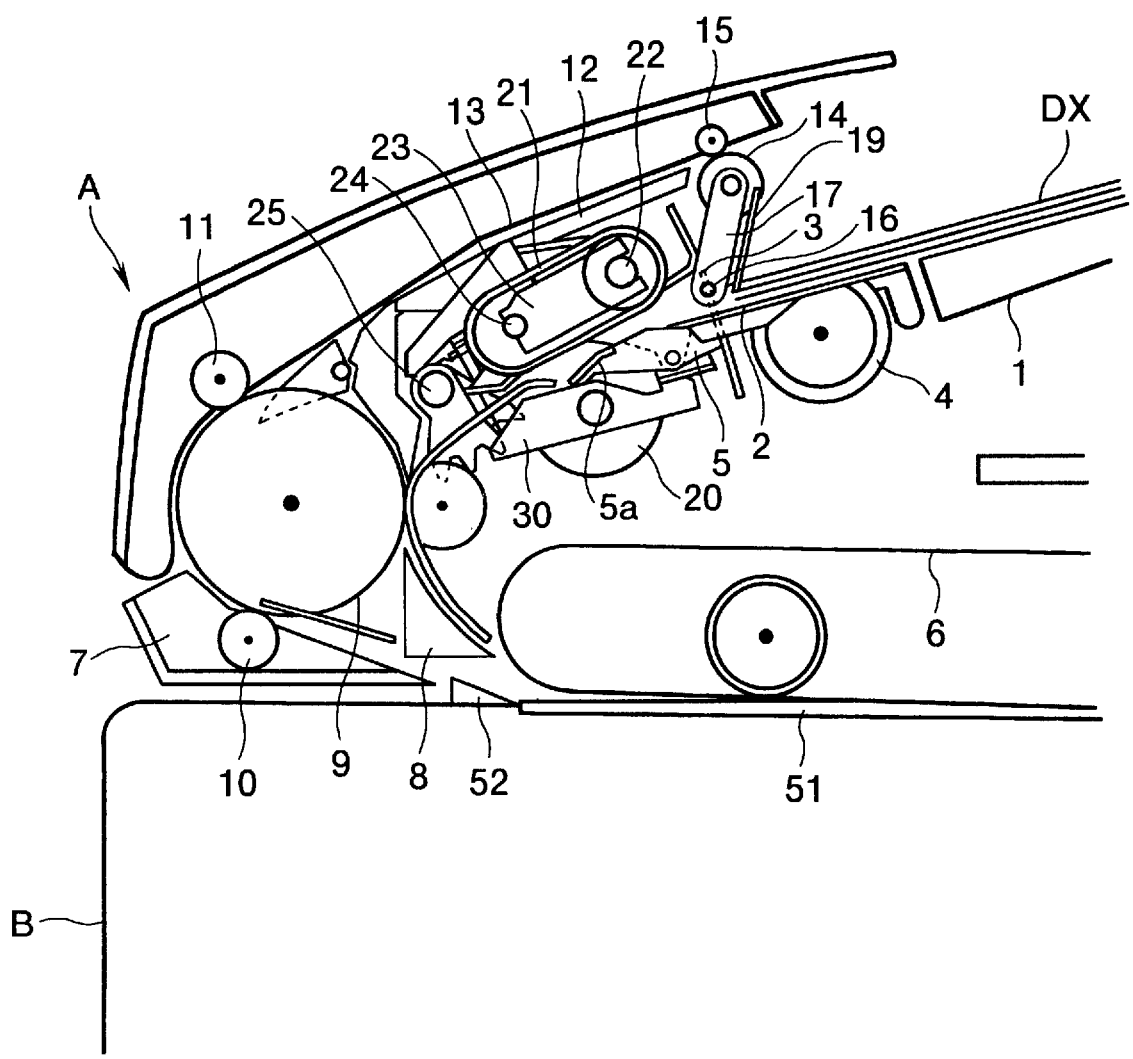
FIG. 1 is a schematic sectional view showing an internal construction of an automatic original supplying apparatus according to the present invention.

FIG. 1 shows an internal construction of an automatic original supplying apparatus according to the present invention. In the automatic original supplying apparatus A, an operator or a user can set an original bundle DX on a sheet supply tray (original tray) 1 in a face-up fashion. The automatic original supplying apparatus A can be incorporated into a composite copying machine B of digital type having both a copying function and a facsimile function (referred to merely as "composite copying machine" hereinafter) which will be fully described later with reference to FIG. 14.

In FIG. 1, the reference numeral 2 denotes a rock guide; 3 denotes a shutter; 4 denotes a semi-circular roller; 5 denotes a pre-separation guide; 6 denotes a convey belt; 7, 8, 12 and 13 denote guides; 14 denotes a sheet discharge roller; 10, 11 and 15 denote pinch rollers; 16 denotes a rotary shaft on which an arm 17 is mounted; 19 denotes an original hold-down member; 20 denotes a separation roller; 21 denotes a separation belt; 22 denotes a drive pulley; 23 denotes a belt support; 24 denotes a driven pulley; 25 denotes a cam shaft; 51 denotes a platen; and 52 denotes a left jump plate.

In the automatic original supplying apparatus A having the above-mentioned construction, when the originals are processed, first of all, the original bundle DX is set on the sheet supply tray 1 in the face-up fashion. In a copy mode, as shown in FIG. 2A, a lowermost original D3 (third page) in the original bundle DX is supplied to a separation portion C by the semi-circular roller 4. In the separation portion C, the lowermost original is separated by the lower separation, and the lowermost original D3 alone is rested on the platen 51 of the composite copying machine B. Then, when the image exposure (for a copying operation) of the composite copying machine B is finished, the original (lowermost original D3) is conveyed to the left (as shown by the arrow) by the convey belt 6, and then is returned to the sheet supply tray 1 through the convey roller 9 and the sheet discharge roller 14. In this way, the originals are successively supplied and discharged. After all of the originals were discharged, the original bundle DX is restored to the initial condition that was set by the operator.

On the other hand, in a facsimile mode, as shown in FIG. 2B, the original bundle DX is conveyed toward the separation portion by acting the sheet discharge roller 14 as a pick-up roller. Incidentally, the sheet discharge roller 14 is rotatably mounted on a free end of the arm 17 (FIG. 1) pivotable around the rotary shaft 16 so that, in the facsimile mode, whenever the original was supplied, the sheet discharge roller is dropped down on the original bundle. When an uppermost original D1 (first page) enters into the separation portion C by the aid of the sheet discharge roller 14, the separation portion C performs the upper separation, with the result that the uppermost D1 alone is supplied to a direction shown by the arrow and is rested on the platen 51. Then, when the uppermost original D1 is rested on the platen 51, the composite copying machine B performs an original image information reading operation for the FAX transmission.

Incidentally, the original (uppermost original D1) which was read is conveyed to the right (FIG. 2B) as shown by the arrow by the convey belt 6 and then is discharged onto the sheet discharge tray 18 (secured to the composite copying machine B) in a face-down fashion (with imaged surface facing downside) through a pair of right discharge rollers 18M. In this way, the discharged originals are successively stacked on the tray. After all of the originals were discharged, the original bundle DX is rested on the discharge tray 18 in a page sequence opposite to that of the original bundle set on the sheet supply tray 1.

The automatic original supplying apparatus A has a switching mechanism for switching the upper separation function and the lower separation function at the separation portion C so that the upper separation function can be effected in the facsimile mode and the lower separation function can be effected in the copy mode. As shown in FIG. 1, the switching mechanism is so-called comb-separation type in which the separation roller 20 and the separation belt 21 (upper and lower separation members) are rotated in opposite directions (i.e. a convey direction and a reverse direction opposite to the convey direction) and the separation member rotated in the convey direction has a coefficient of friction greater than that of the separation member rotated in the reverse direction so that only one original directly contacted with the separation member rotated in the convey direction is supplied and the other originals are returned by the separation member rotated in the reverse direction.

Figure 3:
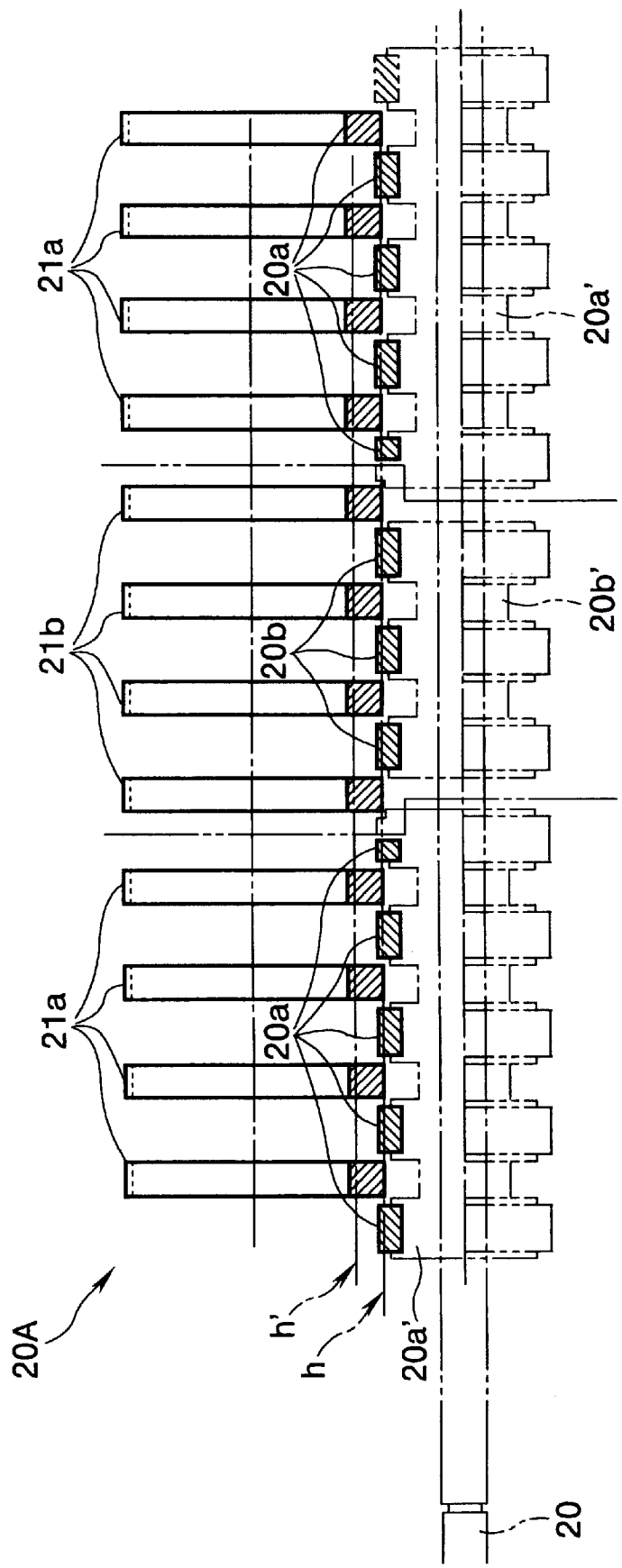
FIG. 3 is a view showing a separation portion of the automatic original supplying apparatus.

FIG. 3 shows the switching mechanism 20A in detail. In FIG. 3, first separation rollers 20a are made of FPDM (ethylene-propylene-diene methylene linkage) having a coefficient of friction of 2.0 with respect to the original. Incidentally, the first separation rollers 20a are secured to flanges 20a' made of POM (polyoxymethylene) resin by press-fit. First separation belts 21a are made of FPDM having a coefficient of friction of 1.2 with respect to the original.

In the copy mode, the first separation rollers 20a and the first separation belts 21a are paired to form a lower separation nip therebetween. And, by rotating the separation rollers 20a in the convey direction and the separation belts 21a in the reverse direction, only the lowermost original is supplied.

Further, second separation rollers 20b and second separation belts 21b are disposed between the paired first separation rollers 20a and belts 21a. In the facsimile mode, the second separation rollers 20b and the second separation belts 21b are paired and the separation belts 21b are rotated in the convey direction and the separation rollers 20b are rotated in the reverse direction, with the result that only the uppermost original is supplied. Incidentally, the separation rollers 20b are made of FPDM having a coefficient of friction of 1.2 with respect to the original and the separation belts 21b are made of FPDM having a coefficient of friction of 2.0 with respect to the original.

When the switching mechanism 20A is constructed as mentioned above, the upper separation pair 20b, 21b obstructs the separation in the lower separation function and the lower separation pairs 20a, 21a obstruct separation in the upper separation function. To avoid such obstruction, in the lower separation, lowermost positions of the first separation belts 21a are positioned at a level h and the second separation belts 21b are positioned at a level h' thereby to release the separation nip between the upper separation pair 20b, 21, and, in the upper separation, the second separation belts 21b are positioned at the level h and the first separation belts 21a are positioned at the level h' thereby to release the separation nips between the lower separation pairs 20a, 21a.

Next, a mechanism for releasing the separation nips will be explained with reference to FIGS. 4A and 4B.

Figure 4A:
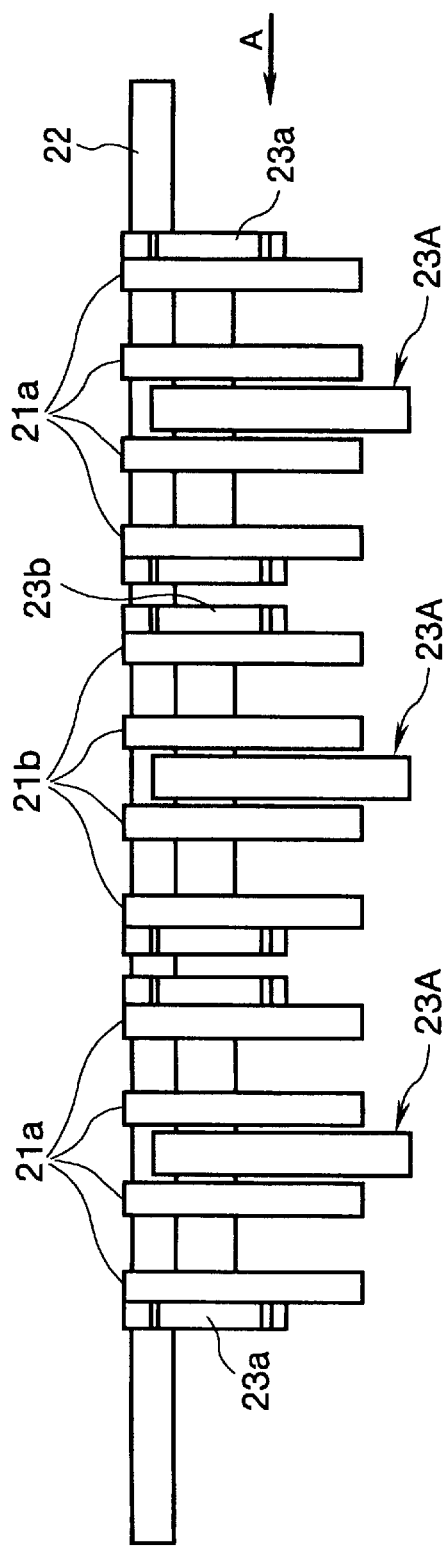
FIGS. 4A and 4B are enlarged views of a main portion of the separation portion of the automatic original supplying apparatus.
Figure 4B:
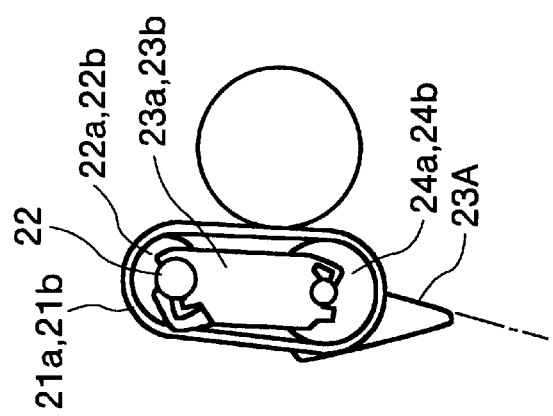

In FIGS. 4A and 4B, the reference numeral 22 denotes a drive shaft for the first and second separation belts 21a, 21b; and 22a and 22b denote belt pulleys made of resin and integrally formed with the drive shaft 22. First and second belt supports 23a, 23b serve to maintain shaft-to-shaft distance between the drive pulleys 22a, 22b and driven pulleys 24a, 24b, which pulleys serve to hold the first and second separation belts 21a, 21b to afford tension to the latter. The first and second belt supports 23a, 23b cab rocked with respect to the drive shaft 22 and the driven pulleys 24a, 24b. By changing a heights of positioning surfaces 23A, the belt supports 23a, 23b are rocked around the drive shaft 22 together with the first and second separation belts 21a, 21b, with the result that the first and second separation belts can be shifted to the level h or h' in FIG. 3, thereby releasing the separation nip or nips.

Next, the change of heights of the positioning surfaces for the belt supports 23a, 23b will be explained with reference to FIGS. 5A to 5C.

Figure 5A:
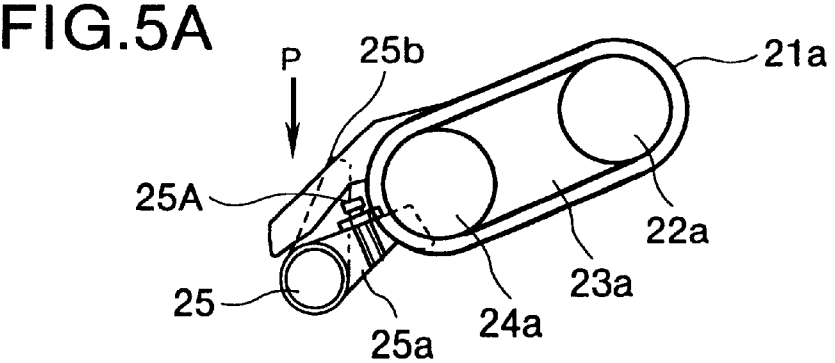
FIGS. 5A to 5C are views for explaining pressurization and pressure release of a belt of the separation portion of the automatic original supplying apparatus.
Figure 5B:
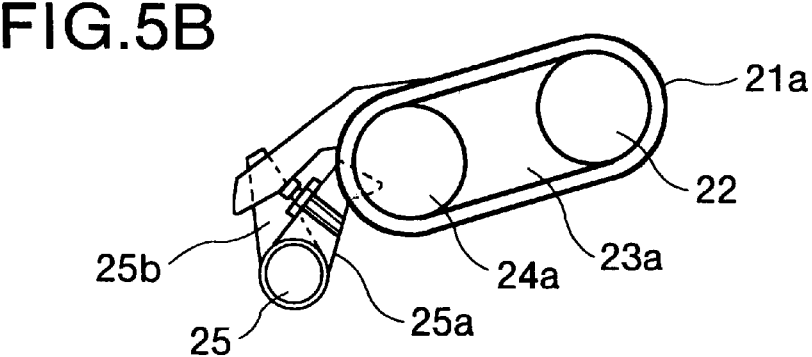
Figure 5C:
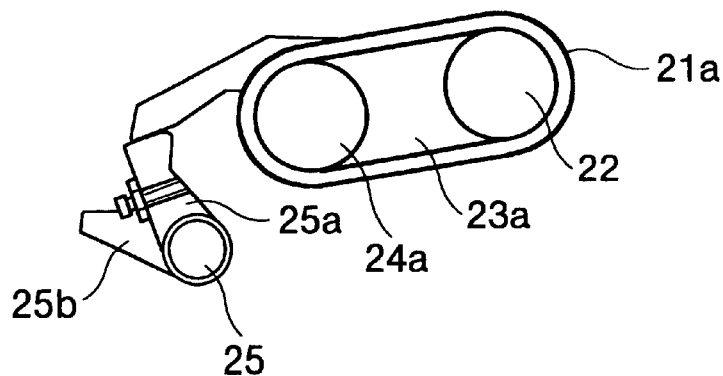

In FIGS. 5A to 5C, the cam shaft 25 can be rotated in clockwise and anti-clockwise directions by 90 degrees, respectively. When the cam shaft is rotated in the clockwise direction by 90 degrees (FIG. 5A), the heights of the separation belts 21 are changed to establish the lower separation condition, and when the cam shaft is rotated in the anti-clockwise direction by 90 degrees (FIG. 5C), the heights of the separation belts 21 are changed to establish the upper separation condition. A first cam 25a and a second cam 25b both of which are made of resin are integrally formed with the cam shaft 25. The first cam 25a is aligned with the positioning surface 23A for the first belt support 23a in a longitudinal direction and the second cam 25b is aligned with the positioning surface for the second belt support 23b in the longitudinal direction.

Incidentally, FIG. 5A shows a copy mode (lower separation condition) in which the first belt support 23a is lowered by the cam phase so that the positioning surface abuts against a head of a screw 25A attached to the first cam 25a. On the other hand, the second belt support 23b is brought to the nip release position by lifting the positioning surface thereof by the second cam 25b. Incidentally, the first and second belt supports 23a, 23b are always biased toward a direction P by biasing means (not shown) so that the positioning surfaces are displaced along the cams 25a, 25b.

When the copy mode is changed to the facsimile mode (upper separation condition), the cam shaft 25 is rotated in the anti-clockwise direction by 90 degrees As a result, the first cam 25a and the second cam 25b are shifted to the upper separation position (FIG. 5C) through an intermediate condition as shown in FIG. 5B.

When the first and second cams 25a, 25b are stopped at the upper separation position, the positioning surface is lifted by the first cam 25a to lift the first belt support 23a, thereby releasing the separation nips. On the other hand, the second belt support 23b is lowered by the second cam 25b to form the upper separation nip. Incidentally, when the cam shaft 25 is rotated in the clockwise direction by 90 degrees from this condition, the lower separation condition is restored.

Since the heights of the belts in the separation nip affects a great influence upon the separation ability, high positional accuracy is required. The reason why the positioning surface 23A abuts against the head of the screw 25A in the nip forming position is that the heights of the belts in the separation nip can be adjusted by the screw 25A if the heights are not included within an allowable range when the height h is measured after the parts are assembled. Further, in order to loose the screws after adjustment, a double-nut arrangement is adopted to each screw.

Figure 6A:
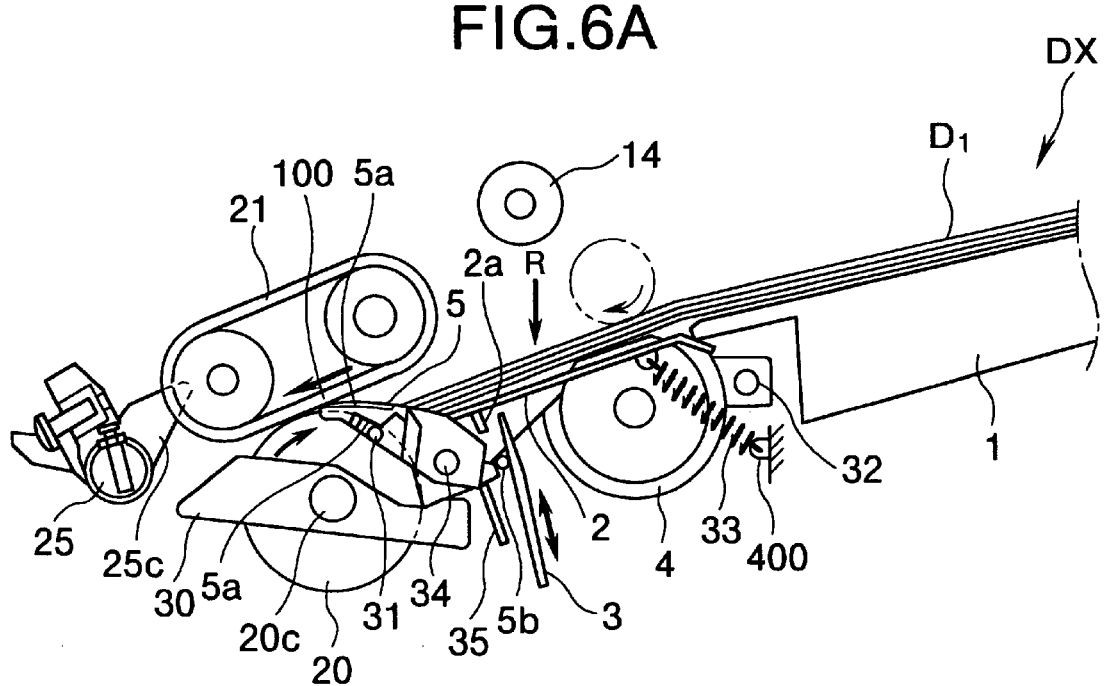
FIGS. 6A and 6B are views showing a sheet guide of the automatic original supplying apparatus.
Figure 6B:
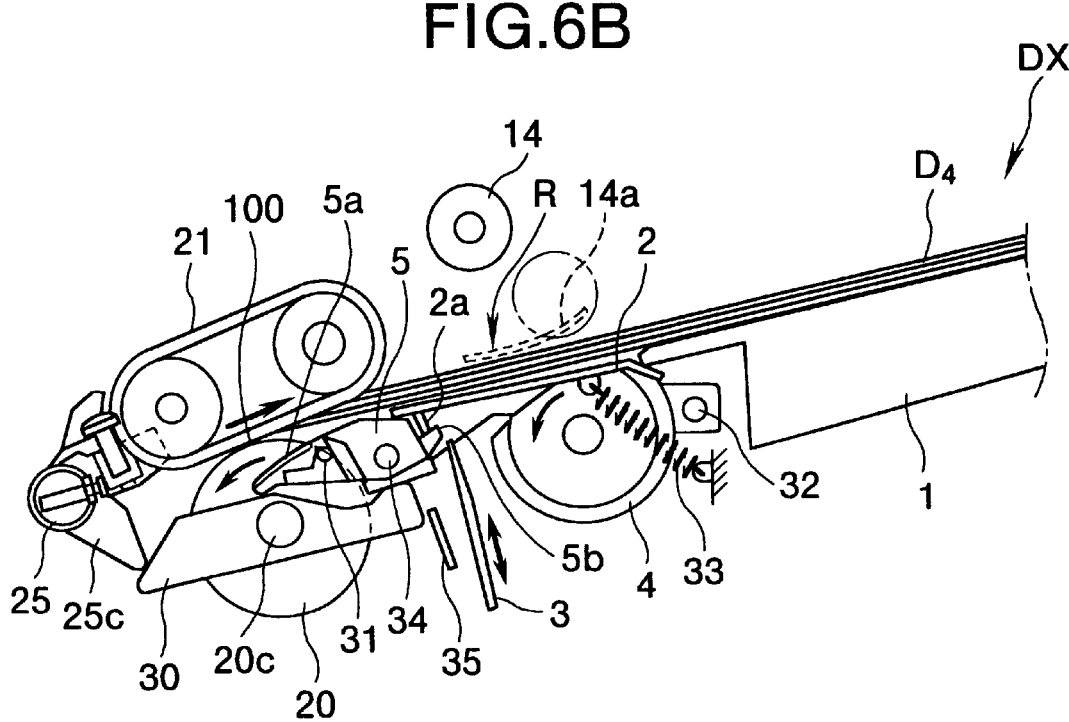

When the upper separation is changed to the lower separation or vice versa, a configuration of the original bundle immediately before the separation nip must be altered. That is to say, as shown in FIGS. 6A and 6B, the uppermost original D1 in the original bundle should be positioned nearest to the separation nip in the upper separation, and the lowermost original D4 in the original bundle should be positioned nearest to the separation nip in the lower separation. In this case, in order to ensure the adequate separating ability in the separation nip, it is important that the tip ends of the originals other than the uppermost original D1 or the lowermost original D4 are stopped by the pre-separation guide 5 or the separation roller 20 (pre-separation).

Under these circumstances, in the illustrated embodiment, as shown in FIGS. 6A and 6B, the configuration of the original bundle immediately before the separation nip is altered. That is to say, as shown in FIG. 6A, in the upper separation, a sheet guide surface R for directing the original bundle DX to the separation nip is constituted by the sheet supply tray 1, rock guide 2 and pre-separation guide 5. The sheet supply tray 1 is secured to the apparatus body, and the rock guide 2 is pivotally supported by a unit side plate 40 (FIG. 11) via a pivot pin 32 and is biased toward an anti-clockwise direction by a tension spring 33 extending between the rock guide and a fixed portion 400 of the side plate 40. By a biasing force of the tension spring, the rock guide is urged against a bent portion 35 of the side plate 40 and is positioned thereto.

The pre-separation guide 5 is supported by the rock guide 2 (forming a tip end portion of the sheet guide surface R) via a fulcrum pin 34 for pivotal movement in an up-and-down direction. The pre-separation guide 5 is rested, by its own weight, on a caulking shaft 31 provided on the side plate 40. Incidentally, a portion of the pre-separation guide 5 aligned with the separation roller in the longitudinal direction has a configuration shown by the broken line.

The tip end portion 5a of the pre-separation guide 5 shown by the broken line is an abutment portion which abuts against the side surface of the original bundle DX when the pre-separation guide 5 is protruded from the sheet guide surface R in the upper separation which will be described later. The tip end portion 5a is constituted by a resisting member M having a coefficient $\mu$ of friction ($\mu$=about 1 to 2) greater than a coefficient of friction (normally about 0.3 to 0.7) between the originals. By increasing the coefficient of friction of the tip end portion 5a greater than the coefficient of friction between the originals in this way, in the upper separation, the originals in the original bundle DX can be deviated one by one from the uppermost original D1, thereby achieving the proper pre-separating effect. Incidentally, the resisting member M providing the high coefficient of friction may be formed, for example, from urethane rubber sheet or CR system (or similar group) rubber sheet. However, so long as the moderate resistance is given to the original contacted with the resisting member and the resisting member and the original are not damaged, the resisting member can be formed from non-rubber sheet such as sea gull suede or felt.

Figure 7:
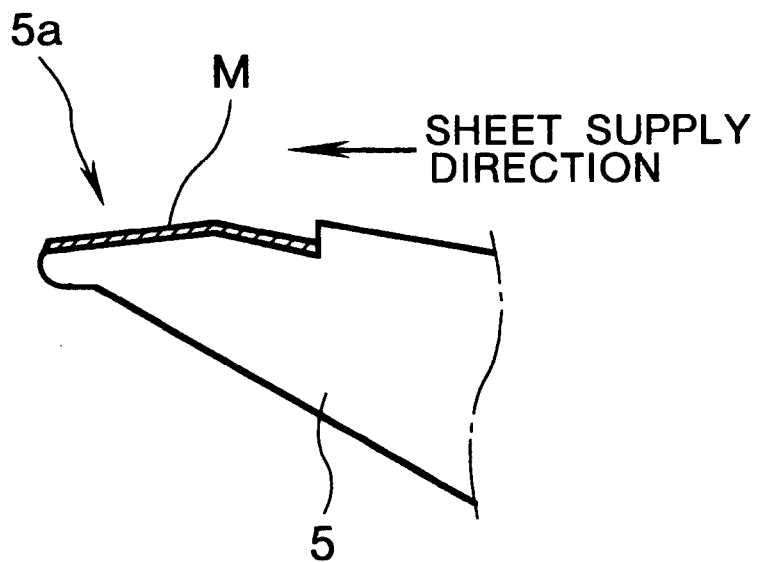
FIG. 7 is a view showing a resisting member adhered to a pre-separation guide.
Figure 8:
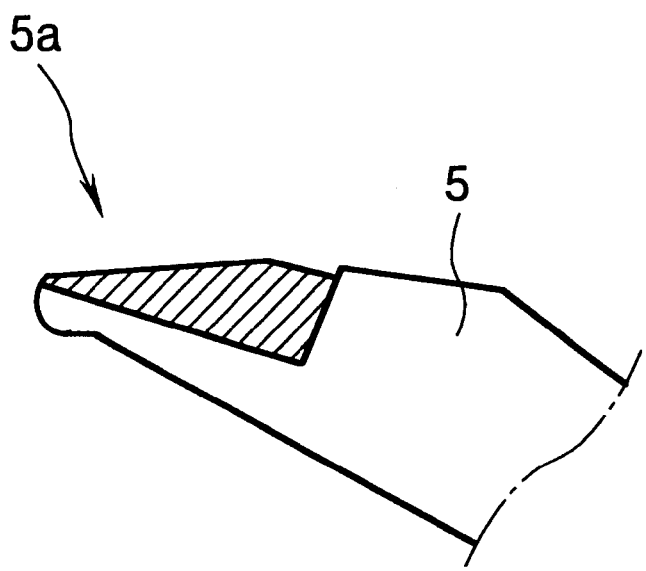
FIG. 8 is a view showing another embodiment of the pre-separation guide.

Further, when the resisting member has a sheet shape, as shown in FIG. 7, the resisting member M may be adhered to a recessed portion of the tip end portion 5a of the pre-separation member 5 or may be coated on the tip end portion 5a so that the leading end of the original is not caught by the trail end of the resisting member. Alternatively, when the resisting member is not sheet-shaped, as shown in FIG. 8, the pre-separation guide 5 may be constituted by integrating the resisting member with the tip end portion 5a.

In the upper separation, the pre-separation guide 5 having the tip end portion 5a constructed as mentioned above is rocked around the fulcrum shaft to protrude upwardly from the sheet guide surface R in an inclined fashion in the vicinity of the separation nip 100. When the pre-separation guide 5 is protruded from the sheet guide surface R in this way, the side surface of the original bundle DX advancing toward the separation nip 100 by its own weight abuts against the tip end portion 5a.

Since the coefficient of friction of the tip end portion 5a is greater than the coefficient of friction between the originals, the originals in the original bundle DX are deviated one by one from the uppermost original D1, thereby realizing the deviation of originals (pre-separation) suitable for the upper separation. Incidentally, in the upper separation, since the tip end portion 5a of the pre-separation guide 5 is somewhat covered by the lowermost original D4, the tip end portion does not obstruct the conveyance of the original. When a single original is supplied, the original is directly contacted with the tip end portion 5a. In this case, however, since the weight of the single original acts on the tip end portion 5a, the resistance to the conveyance does almost not occur. On the other hand, in the lower separation, as shown in FIG. 6B, in order to realize the deviation of originals (pre-separation) suitable for the lower separation, the pre-separation guide 5 enters into the separation roller 20 so that the resisting member M does not directly contact with the original.

By the way, in the upper separation, as shown in FIG. 6A, the configuration of the guide constituted by the sheet supply tray 1, rock guide 2 and pre-separation guide 5 becomes an U-shape. By the combination of the U-shaped configuration and the action of the resisting member M, the original bundle DX is slid to the left by its own weight, with the result that the side surface (front surface) of the original bundle DX abuts against the tip end portion 5a of the pre-separation guide 5 protruded in the upwardly inclined condition.

When the side surface of the original bundle DX abuts against the pre-separation guide 5 in this way, the originals in the original bundle DX are deviated from each other so that the uppermost original D1 is positioned nearest to the separation nip (pre-separation). As a result, when the sheet discharge roller is then dropped onto the original bundle DX and the driving force acts in the convey direction, the uppermost original D1 rides over the inclined surface of the pre-separation guide 5 to reach the separation nip.

On the other hand, in the lower separation, as shown in FIG. 6B, the cam shaft 25 is rotated in the clockwise direction by 90 degrees from the upper separation condition. Incidentally, in FIGS. 6A and 6B, the reference numeral 25c denotes a guide switching cam; 30 denotes a positioning arm rotatably mounted on a central shaft 20c of the separation roller 20; and 14a denotes a weight plate.

When the cam shaft 25 is rotated, the positioning arm 30 is lowered by the guide switching cam 25c to be rocked around the central shaft 20c in the anticlockwise direction, with the result that the tip end of the rock guide 2 is lifted by a right end portion of the arm. Consequently, the fulcrum shaft 34 of the pre-separation guide 5 is lifted. As a result, since the pre-separation guide 5 is separated from the positioning shaft 31, it is further rotated in the anti-clockwise direction with respect to the rock guide 2, so that the positioning surface 5b abuts against a bent portion 2a of the rock guide 2.

As a result, the lower separation arrangement as shown in FIG. 6B is achieved. In this condition, the operator sets the originals on the sheet stacking portion formed by the sheet supply tray 1 and the rock guide 2. Then, when the copy key is depressed, the shutter 3 is lowered and the semicircular roller 4 is rotated, so that the lowermost original D4 is conveyed toward the separation nip. In this case, since the pre-separation guide 5 is rocked downwardly to be retarded from the sheet guide surface, the pre-separation guide does not interfere with the original bundle DX to minimize the convey load in the separation/supply operation. The sheet stacking surface of the rock guide 2 faces toward the separation nip so that, as shown in FIG. 6B, the lowermost original D4 is positioned nearest to the separation nip and the other originals are returned by the separation belt 21, thereby ensuring the proper pre-separation effect.

In the aforementioned explanation, while an example that the resisting member M is formed independently from the pre-separation guide 5 was explained, for example, a surface of resin of the pre-separation guide may be rough-finished (to the extent that the original is not trapped by the surface) to provide the proper resistance. Further, in the illustrated embodiment, while an example that the separation belt 21 is disposed at the upper side and the separation roller 20 is disposed at the lower side was explained, the separation roller 20 may be disposed at the upper side and the separation belt 21 may be disposed at the lower side.

Figure 9:
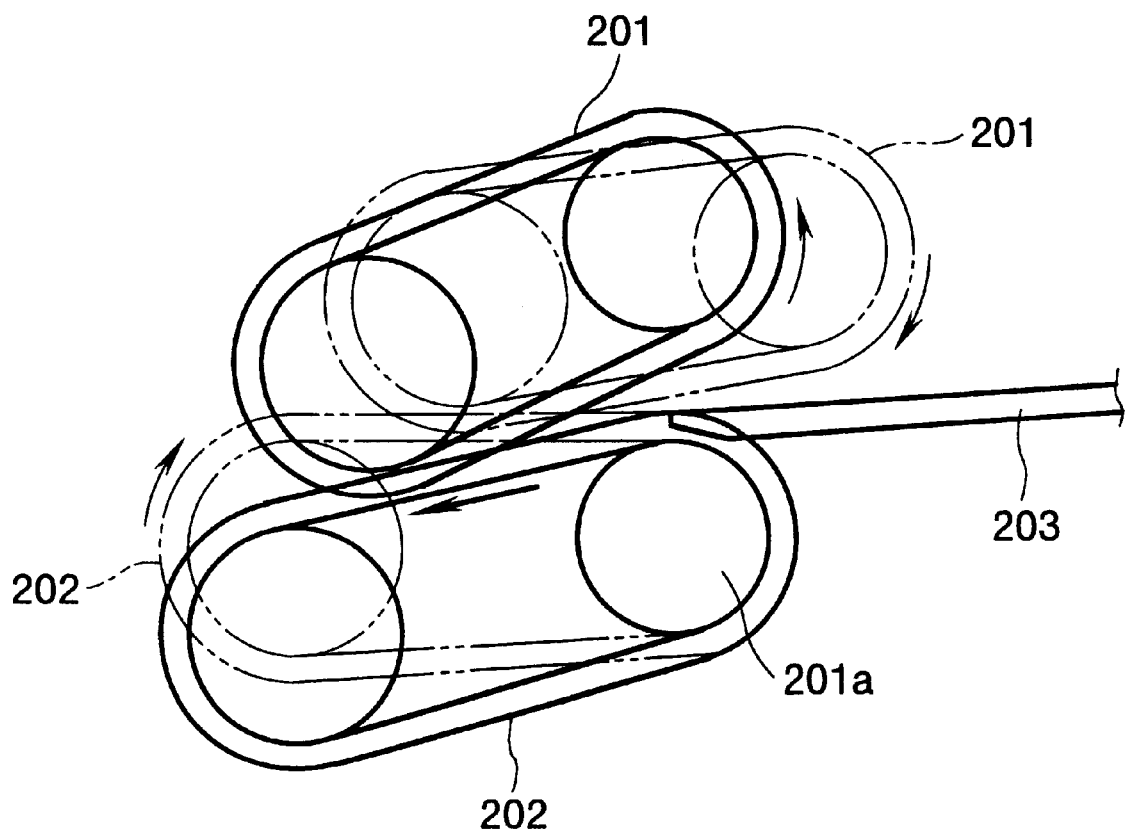
FIG. 9 is a view showing a portion of a separation portion of an automatic original supplying apparatus according to another embodiment of the present invention.

Further, as shown in FIG. 9, both the upper and lower separation members may be constituted by belts 201, 202 so that angles of the belts 201, 202 can be changed in the upper separation and the lower separation, respectively, to provide the proper separation portions for the upper separation and the lower separation. Incidentally, in FIG. 9, the two-dot and chain line shows the conditions of the belts 201, 202 suitable for the upper separation and the solid line shows the conditions of the belts suitable for the lower separation. Further, the reference numeral 203 denotes a sheet supply guide; and 201a denotes a fulcrum for the separation belt unit.

In the illustrated embodiment, while an example that the sheet supply guide 203 is fixed and the angles of the belts 201, 202 are changed in the upper separation and the lower separation was explained, the present invention is not limited to such an example, but, the belts 201, 202 may be fixed and the sheet supply guide 203 may be rockable.

Figure 10A:
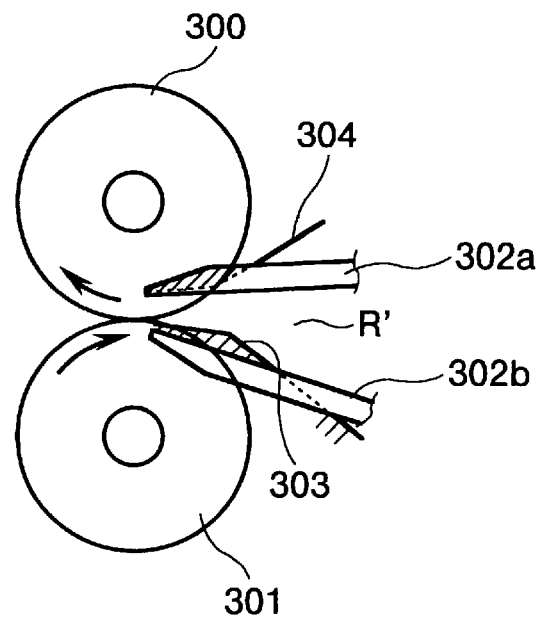
FIGS. 10A and 10B are views schematically showing a separation portion of an automatic original supplying apparatus according to a further embodiment of the present invention.
Figure 10B:
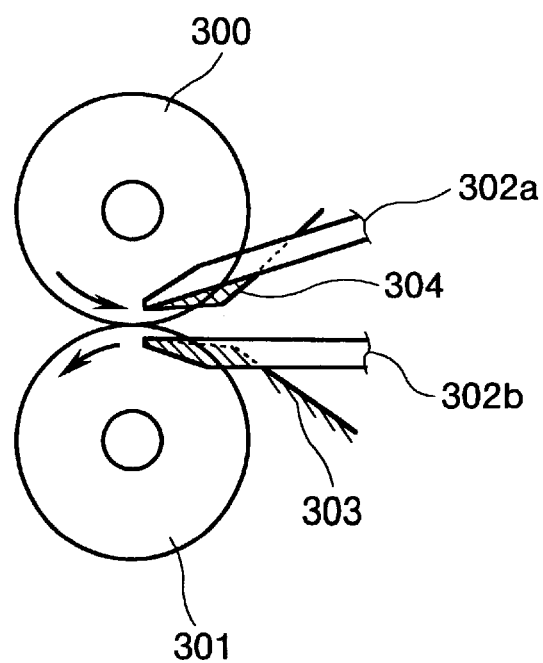

In the previous explanation, while the comb type separation was explained, for example, also in the retard type shown in FIGS. 10A and 10B, two upper and lower rollers 300, 301 may be reversible (in the upper separation and the lower separation) by means of a drive switching means (not shown) so that the upper roller 300 acts as a sheet supply roller and the lower roller 301 acts as a retard roller in the upper separation, as shown in FIG. 10A.

Further, there may be provided a pair of upper and lower guide members (upper sheet supply guide 302a and lower sheet supply guide 302b) and a pair of upper and lower pre-separation members 304, 303. In this case, in the upper separation, by rocking the upper sheet supply guide 302a downwardly to protrude it into a guide passage R' thereby to retard the upper pre-separation member 304 from the guide passage R' to protrude only the lower pre-separation member 303 into the guide passage R', the deviation of the original bundle (pre-separation) suitable for the upper separation can be achieved.

On the other hand, in the lower separation, as shown in FIG. 10B, the drive is switched so that the upper roller 300 acts as a retard roller and the lower roller 301 acts as a sheet supply roller. In this case, by rocking the lower sheet supply guide 302b upwardly to retard the lower pre-separation member 303 from the guide passage R' so that only the upper pre-separation member 304 is protruded into the guide passage R', the deviation of the original bundle (pre-separation) suitable for the lower separation can be achieved. Incidentally, in this arrangement, while an example that the pre-separation members 303, 304 are fixed and the sheet supply guides 302a, 302b are rockable was explained, the sheet supply guides 302a, 302b may be fixed and the pre-separation members 303, 304 may be rockable.

As mentioned above, in the illustrated embodiment, by effecting the pressurization or pressure release of the separation belt 21 and by changing the configuration of the sheet guide before separation, the upper separation and the lower separation can be realized by the single separation portion.

In the illustrated embodiment, the switching between the upper separation and the lower separation is effected by changing the phase of the cam shaft. Although the phase can be changed by electrical control using a solenoid, an electromagnetic clutch or the like, in the illustrated embodiment, by using a mechanical means which will be described hereinbelow, cost-down and simplicity can be achieved.

Figure 11:
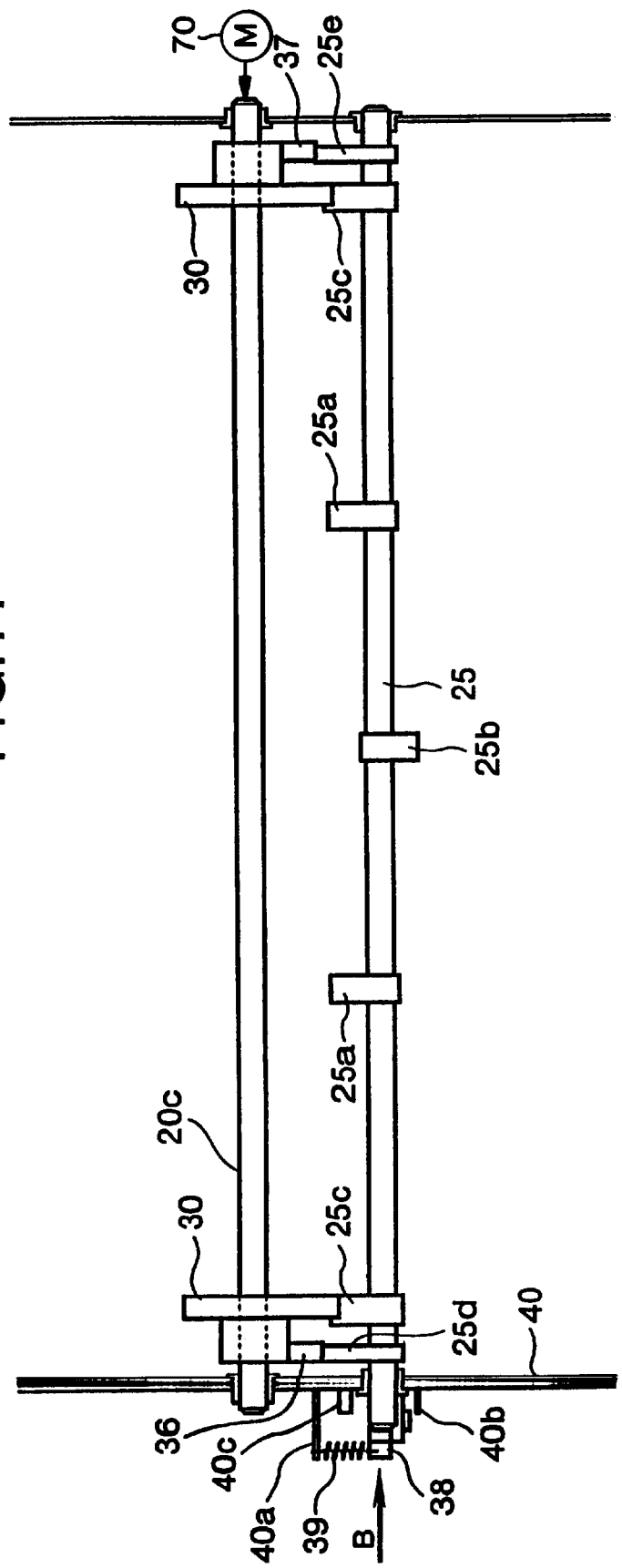
FIG. 11 is a plan view of the separation portion of the automatic original supplying apparatus.

FIG. 11 is a plan view of the separation portion for explaining a cam shaft switching mechanism. In FIG. 11, first and second arms 36, 37 includes one-way clutches fitted on the separation roller shaft 20c. Only when the separation roller shaft 20c is rotated in the clockwise direction, a driving force is transmitted to the first arm 36, and, only when the separation roller shaft 20c is rotated in the anti-clockwise direction, a driving force is transmitted to the second arm 37.

Third and fourth arms 25d, 25e are secured to the cam shaft 25, and the third and fourth arms 25d, 25e are associated with the first and second arms 36, 37, respectively. Further, a spring support plate 38 is secured to one end of the cam shaft 25 by screws, and a tension spring 39 extends between the spring support plate 38 and a bent portion 40a of the side plate 40 as shown in FIG. 12 (view looked at from a direction B in FIG. 11) so that a toggle force acts on the cam shaft 25 by the tension spring 39.

Figure 12:
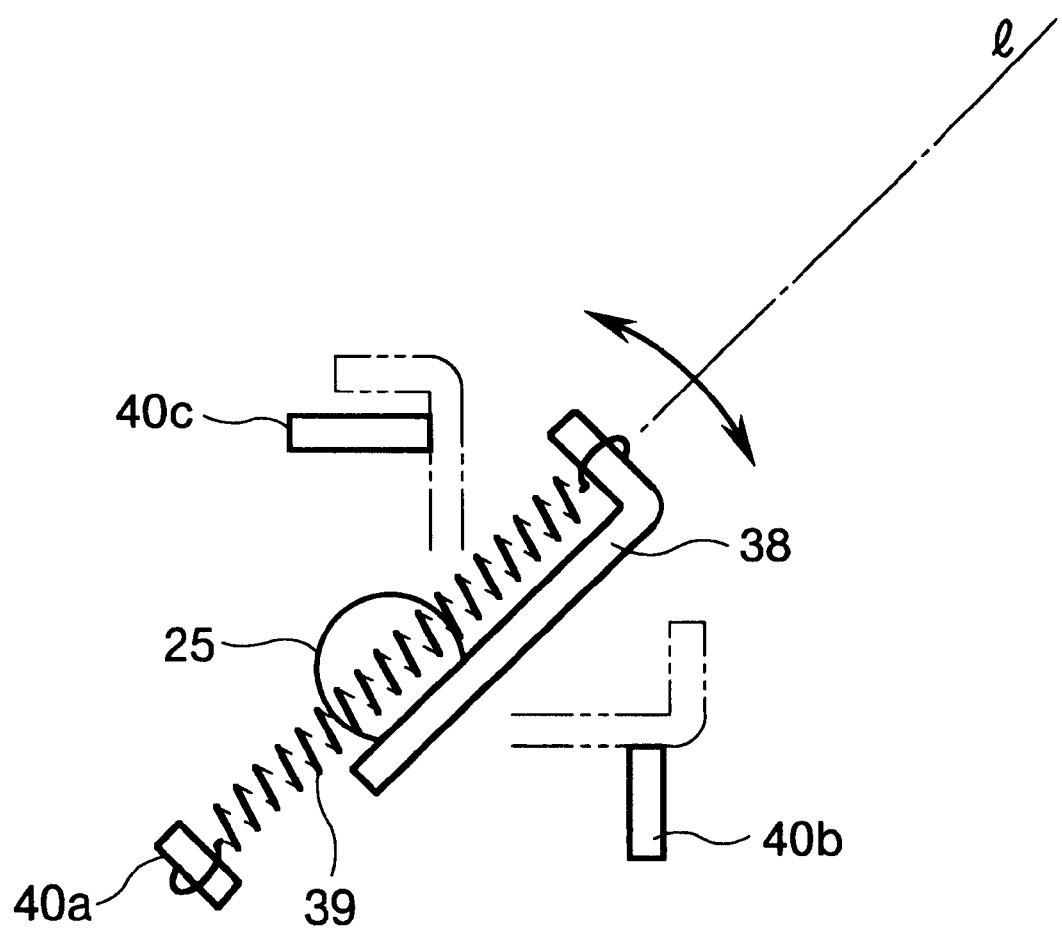
FIG. 12 is an enlarged view of a main portion of the separation portion.

In FIG. 12, l shows a neutral phase of the cam shaft 25. When the cam shaft 25 is positioned in the neutral phase, rotational moment generated by the spring 39 is zero; whereas, when the cam shaft 25 is rotated in the anti-clockwise direction, anti-clockwise rotational moment is generated, and, when the cam shaft 25 is rotated in the clockwise direction, clockwise rotational moment is generated. As the cam shaft 25 is rotated in the clockwise direction, the spring support plate 38 abuts against a stopper (bent portion) 40b of the side plate 40 to stop the cam shaft. This condition corresponds to the lower separation condition in the copy mode. On the other hand, as the cam shaft 25 is rotated in the anti-clockwise direction, the spring support plate 38 abuts against a stopper 40c to stop the cam shaft. This condition corresponds to the upper separation condition in the facsimile mode.

Figure 13A:
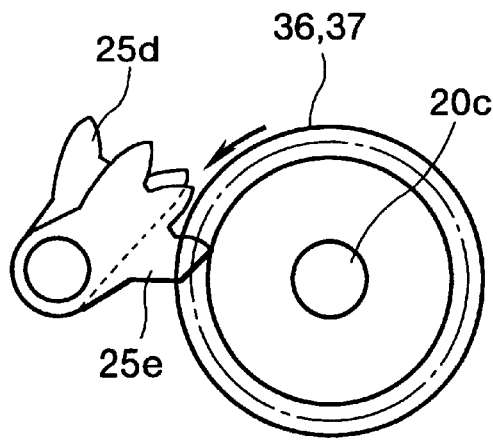
FIGS. 13A to 13C are views for explaining a cam phase changing operation of the automatic original supplying apparatus.
Figure 13B:
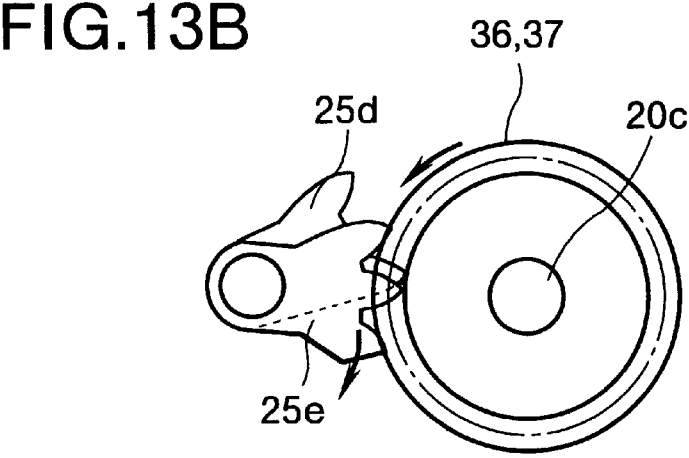
Figure 13C:
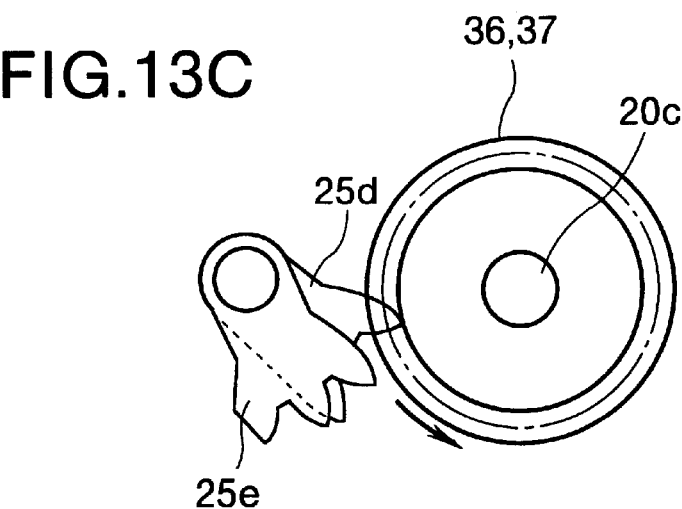

FIGS. 13A, 13B and 13C are front sectional views showing operations of the arms for switching the phase of the cam shaft 25. The FIG. 13A shows the upper separation condition. In the upper separation, since the separation roller shaft 20c was rotated in the clockwise direction, the driving force is transmitted to the first arm 36 through the one-way clutch, but, the corresponding third arm 25d is positioned not to interfere with or engage by the first arm even when the first arm 36 is rotated. Incidentally, the fourth arm 25e is positioned to interfere with the corresponding second arm 37 when the second arm is rotated. In this case however, there is no problem because the driving force is not transmitted to the second arm 37 through the one-way clutch.

Next, the switching from the upper separation to the lower separation will be explained. To perform the switching, a drive motor 70 of the separation portion is rotated reversely to rotate the separation roller shaft 20c in the anti-clockwise direction. As a result, the driving force is transmitted to the second arm 37, so that the second arm is engaged by the fourth arm 25e, thereby rotating the cam shaft 25 in the clockwise direction.

When the cam shaft 25 is rotated to a point exceeding the toggle neutral position shown in FIG. 13B, the cam shaft 25 is further rotated by the rotational moment of the tension spring 39 to the lower separation position shown in FIG. 13C. In this condition, the fourth arm 25e is positioned not to interfere with the corresponding second arm 37 and the third arm 36 is positioned to interfere with the first arm 36. Thus, the drive motor of the separation portion is rotated again reversely from the lower separation condition, the driving force is transmitted to the first arm 36, with the result that the first arm is engaged by the third arm 25e, thereby rotating the cam shaft 25 in the anti-clockwise direction. When the cam shaft 25 is rotated to a point exceeding the toggle neutral position, the cam shaft 25 is further rotated by the rotational moment of the tension spring 39 to the upper separation position shown in FIG. 13A.

As mentioned above, in the illustrated embodiment, by the normal and reverse rotations of the drive motor of the separation portion, the rotational direction of the separation pair (belt and roller) is changed to perform the switching between the upper separation and the lower separation thereby to change the phase of the cam shaft. In this way, the configuration of the sheet guide before separation is changed and the separation is formed or released.

In the illustrated embodiment, while the separation portion of comb separation type was explained, the present invention may be applied to other separation types such as a retard separation type. Further, since the alteration of the separation portion (formation and release of the nip, configuration of the sheet guide before separation) for switching between the upper separation and the lower separation is effected under the mechanical action (normal and reverse rotation of the drive motor of the separation portion), electrical drive means (solenoid, electromagnetic clutch or the like) can be omitted, thereby achieving the cost-down and simplifying electrical control.

Next, an embodiment of an image forming apparatus for forming an image by using the above-mentioned automatic original supplying apparatus will be explained with reference to FIG. 14.

Figure 14:
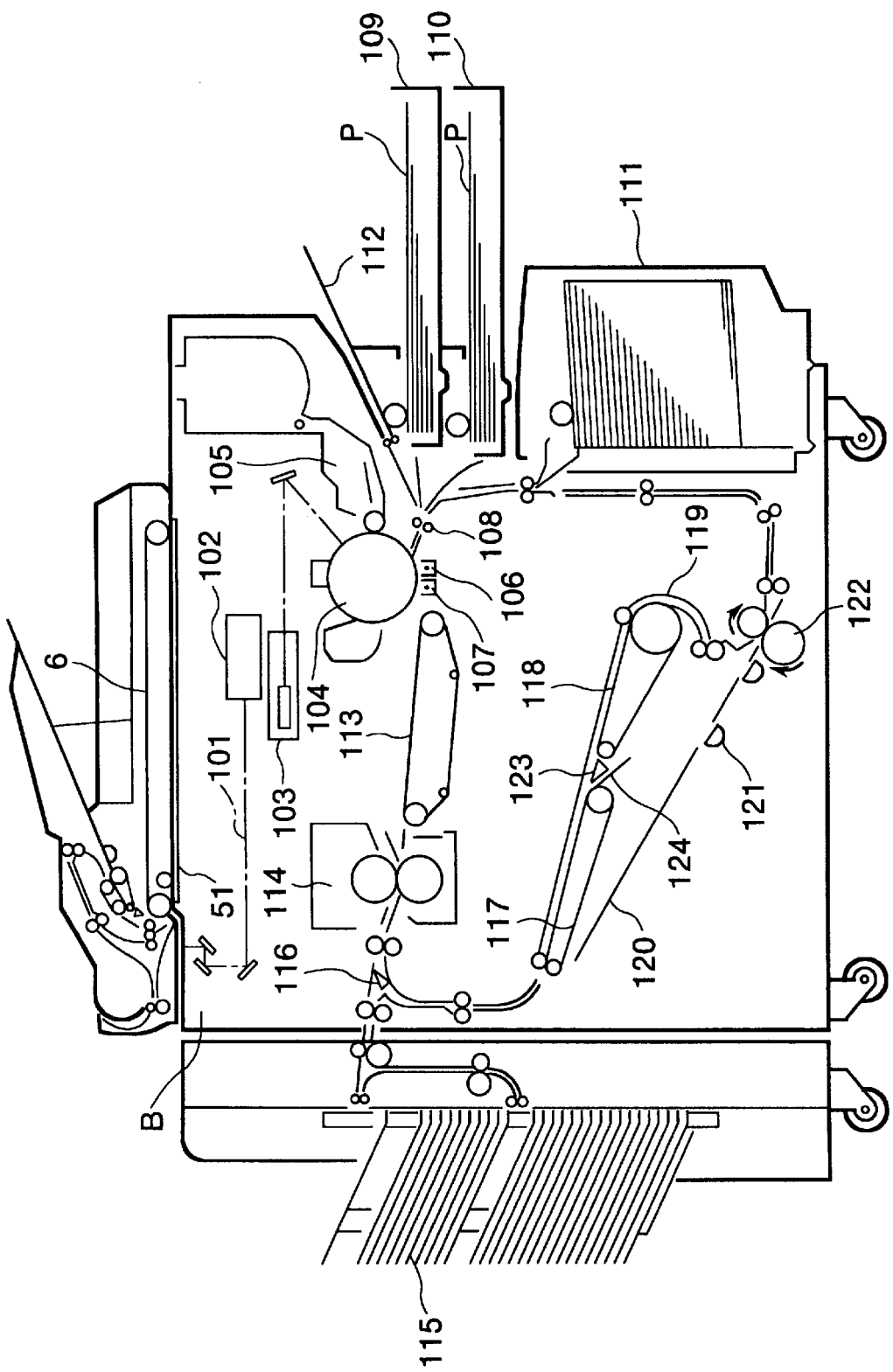
FIG. 14 is a schematic sectional view of an image forming apparatus according to the present invention.
Figure 15:
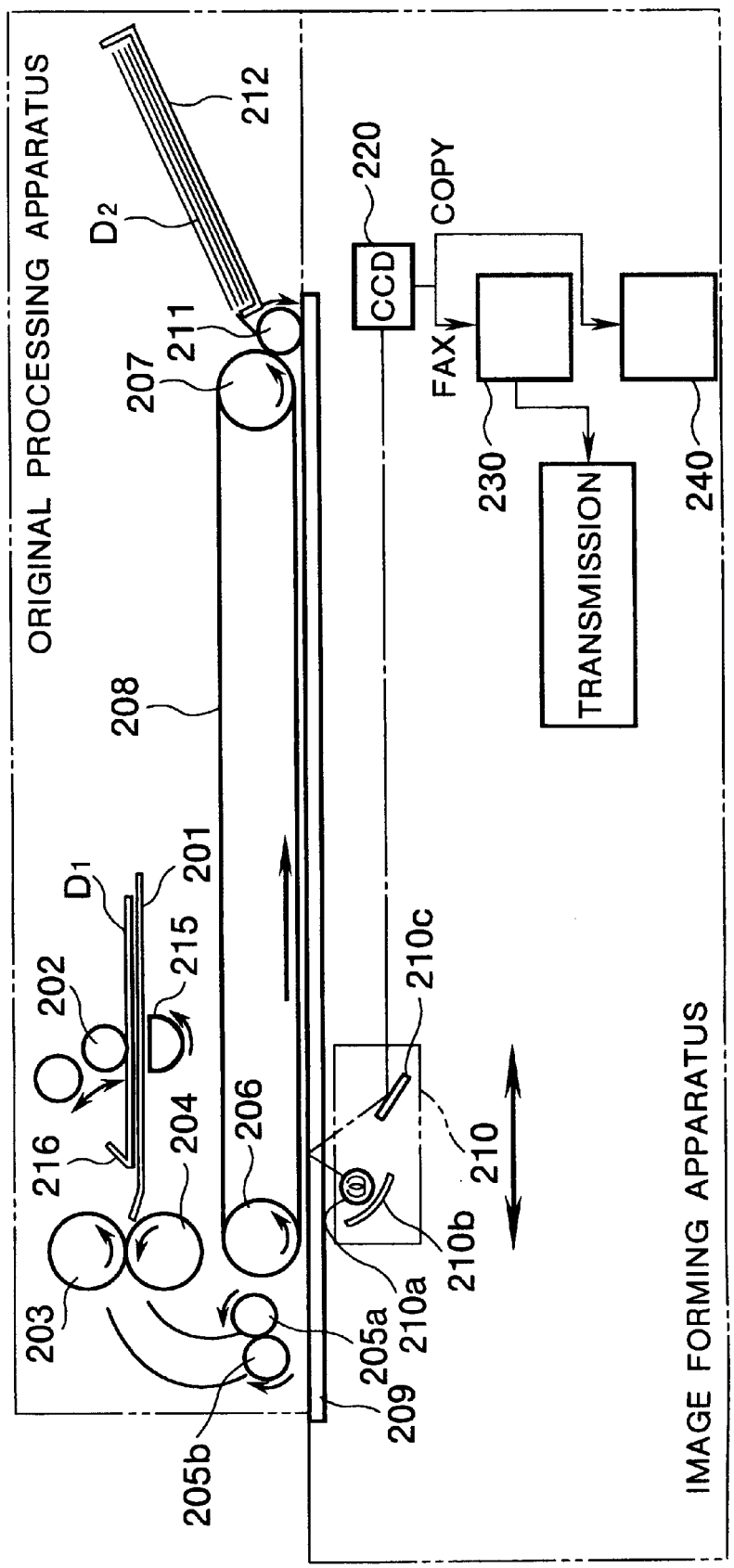
FIG. 15 is a schematic illustration showing a conventional automatic original supplying apparatus.
Figure 16A:
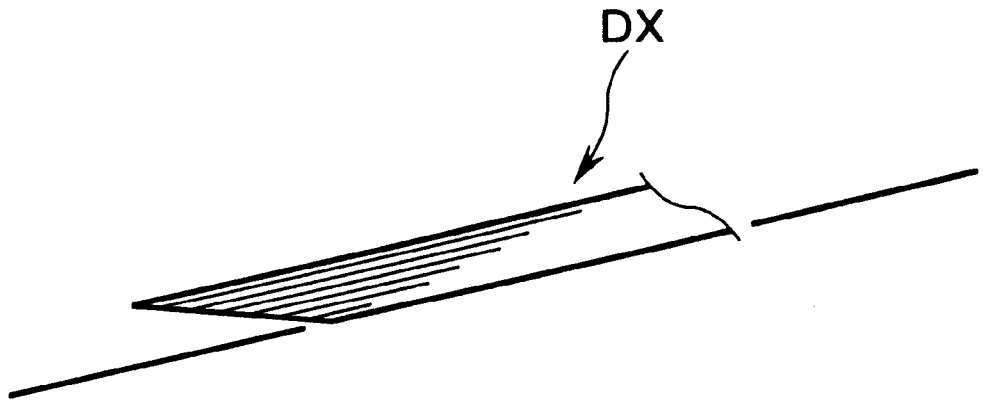
FIGS. 16A and 16B are views showing preferable original bundle conditions (pre-separation conditions) in upper separation and lower separation.
Figure 16B:
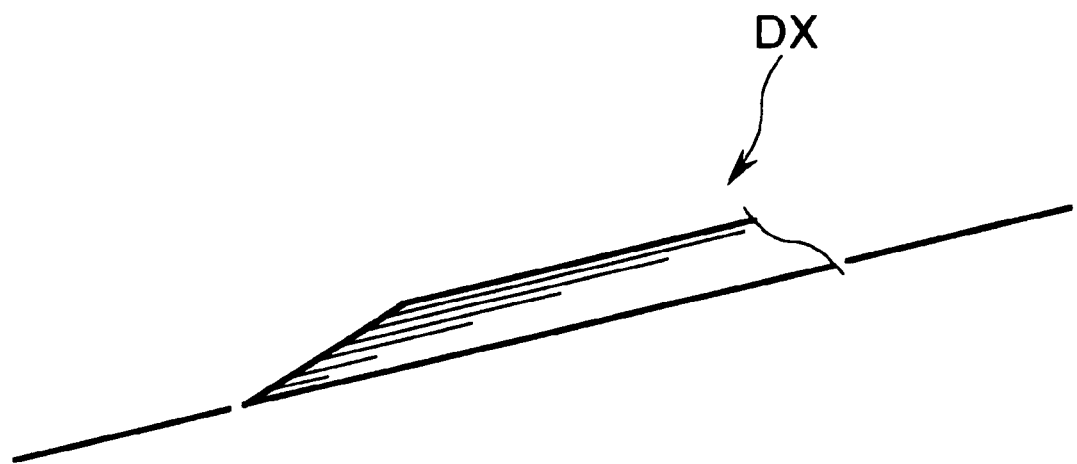

In FIG. 14, the original conveyed by the convey belt 6 is rested on the platen 51, and an image is formed by a lower image forming apparatus. That is to say, the original is illuminated by a lamp (not shown), and light 101 reflected from the original on the platen 51 is converted into an image information signal by an optical reading device 102 such as CCD. On the other hand, a laser beam is emitted from a laser scanner unit 103 in response to the image information signal to expose a photosensitive drum 104, thereby forming a latent image. The latent image is developed by a developing device 105 with toner as a toner image. The toner image is transferred onto a sheet P (conveyed by a pair of regist rollers 108) by a transfer means 106, 107. The sheet P is supplied to the regist rollers 108 from a removable cassette 109 or 110 or deck 111 or a manual insertion tray 112.

Figure 17:
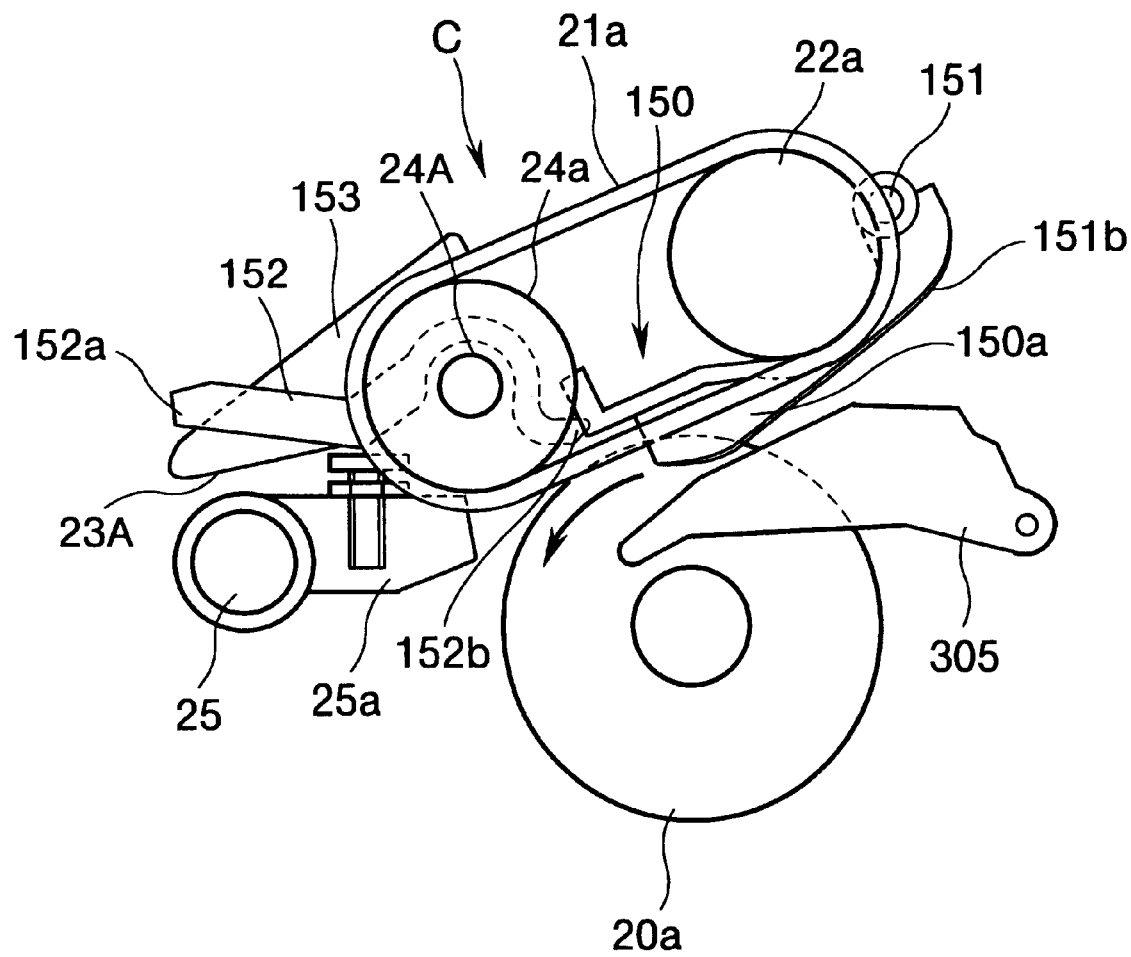
FIG. 17 is a view showing a lower separation condition of a separation portion according to the other embodiment.
Figure 18:
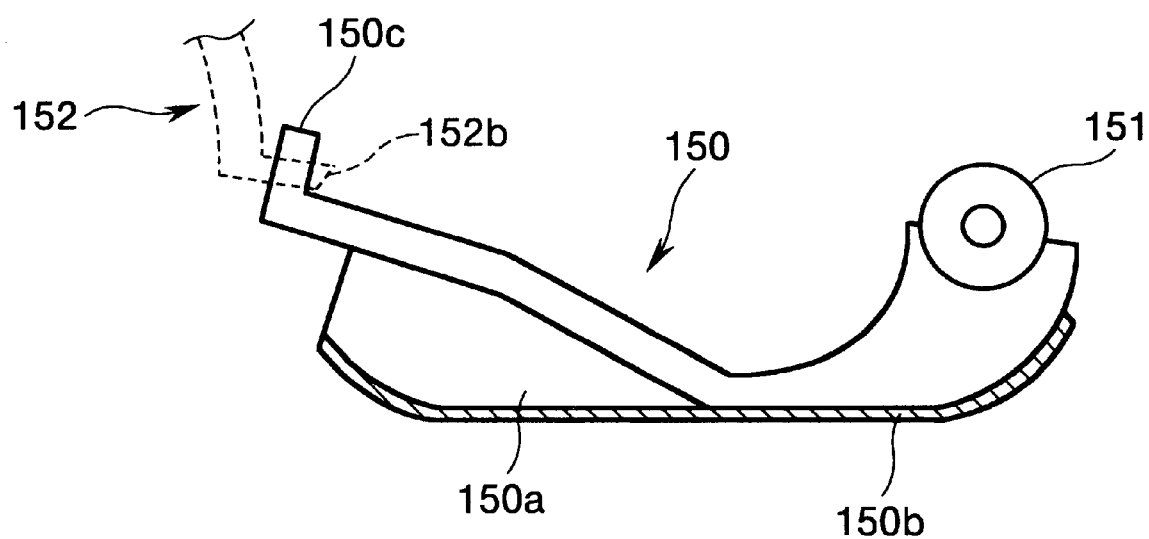
FIG. 18 is a front view of a separation guide provided in the separation portion.

The sheet P to which the toner image was transferred is sent to a fixing device 114 through a convey belt 113. In a one-face copy mode, the sheet is discharged onto a discharge tray 115 through discharge rollers. In a both-face copy mode, the sheet P to which the toner image was fixed at one surface thereof is reversely rotated and conveyed through a flapper 116, convey belts 117, 118 and a reverse rotation guide 119 and is temporarily stored on an intermediate tray 120. Then, the sheet is sent to the regist rollers 108 through a semi-circular roller 121 and rollers 122 and the like. Then, similar to the above, an image is transferred onto the other surface of the sheet and then the image is fixed. When a new image is formed on the imaged surface of the sheet again, the sheet is conveyed toward a direction 124 by a flapper 123 and then is conveyed to the regist rollers as is in the both-face copy mode. <Other Embodiments>As shown in FIG. 17, the separation portion C may include an original separation aiding member (separation guide) 150 pivotable around a support portion 151. The separation guide 150 has a body portion 150a positioned in the vicinity of and at an upstream side of a nip between the roller 20 (first separation roller 20a in this embodiment) and the separation belt (first separation belt 21a in this embodiment), and, as shown in FIG. 18, a separation pad 150b comprised of a rubber layer is secured to an outer surface portion of the body portion 150a which can be contacted with the original or the separation roller 20a. The body portion 150a is made of sponge material so that, when the body portion is urged against the first separation roller 20a, an elastic force is generated by deformation of the sponge. Incidentally, the reference numeral 305 denotes a pre-separation guide having a similar construction and same function as the guide 5 shown in FIG. 1. However, the pre-separation guide does not include the resisting material M.

The first separation roller 20a has a coefficient of friction greater than those of the first separation belt 21a and of the rubber layer of the separation pad 150b so that, in the lower separation, the originals other than the lowermost original D4 are stopped by the first separation belt 21a and the separation pad 150b and only the lowermost original D4 is separated by the first separation roller 20a to be conveyed.

In the lower separation, as shown in FIG. 17, the separation guide 150 is rocked to protrude between the first separation belt 21a and the first separation roller 20a, with the result that the separation guide is urged against the uppermost original D1 on the original bundle DX (before separation) entering into the separation nip, thereby causing the deviation of the originals in the original bundle in a wedged shape. Thus, without strong separation pressure as is in the conventional case, the original (lowermost original D4) can be separated from the original bundle DX. Since the lowermost original D4 can be separated without the strong separation pressure, the sliding force between the lowermost original D4 and a next original can be reduced, thereby permitting the separation of the original without smudge.

The sponge from which the body portion 150a is formed in foam urethane sponge having relatively uniform cells so that uniform compression load and less residual strain can be obtained. Further, a surface of the body portion is formed from a urethane rubber layer to which ink, toner, pencil pigment and the like are hard to be adhered. In this case, a sheet-shaped rubber layer is adhered to the sponge.

The present invention is not limited to the above example, but, a liquid rubber may be coated on the sponge, or, if silicone oil is adhered to the surface of the original, the surface layer may be formed from silicone rubber.

The material of the separation pad 150b is not limited to rubber, so long as the separation pad has a predetermined coefficient of friction required to stop the original and the material has adequate durability and ink is hard to be adhered to the material. While the rubber layer was explained, other material such as sea gull suede or felt achieving the same effect as rubber may be used. Further, as a separation rotary member, a roller may be used.

With the arrangement as mentioned above, the smudge of the originals can be prevented. However, in the upper separation, the separation guide 150 obstructs the conveyance of the originals. To avoid this, as shown in FIG. 17, the separation portion C is provided with a separation guide cam 152 for shifting the separation guide 150 to a position where the separation guide is not contacted with the original bundle in the upper separation. The separation guide cam 152 is engaged by a driven shaft 24A of a driven pulley 24 to be rocked in an up-and-down direction so that, as mentioned above, when the driven shaft 24A of the driven pulley 24a is lifted as the separation belt 21a is shifted upwardly in the upper separation, the separation guide cam is also lifted accordingly. One end 152a of the separation guide cam 152 is held by a guide (not shown) not to change its position so that only the other end 152b of the separation guide cam 152 (near the separation guide 150) is lifted by the driven shaft 24A of the driven pulley 24a.

Further, as shown in FIG. 18, an engagement portion 150c is formed on the other end of the separation guide 150, which engagement portion 150c can be engaged by the other end 152b of the guide cam so that, in the lower separation, the separation guide 150 is shifted to a position where the separation guide is contacted with the upper surface of the original bundle DX, and in the upper separation, the separation guide is shifted to a position where the separation guide is not contacted with the original. With this arrangement, when the other end 152b is lifted, the rear end 152b of the separation guide cam 152 is engaged by the engagement portion 150c of the separation guide 150.

Figure 19:
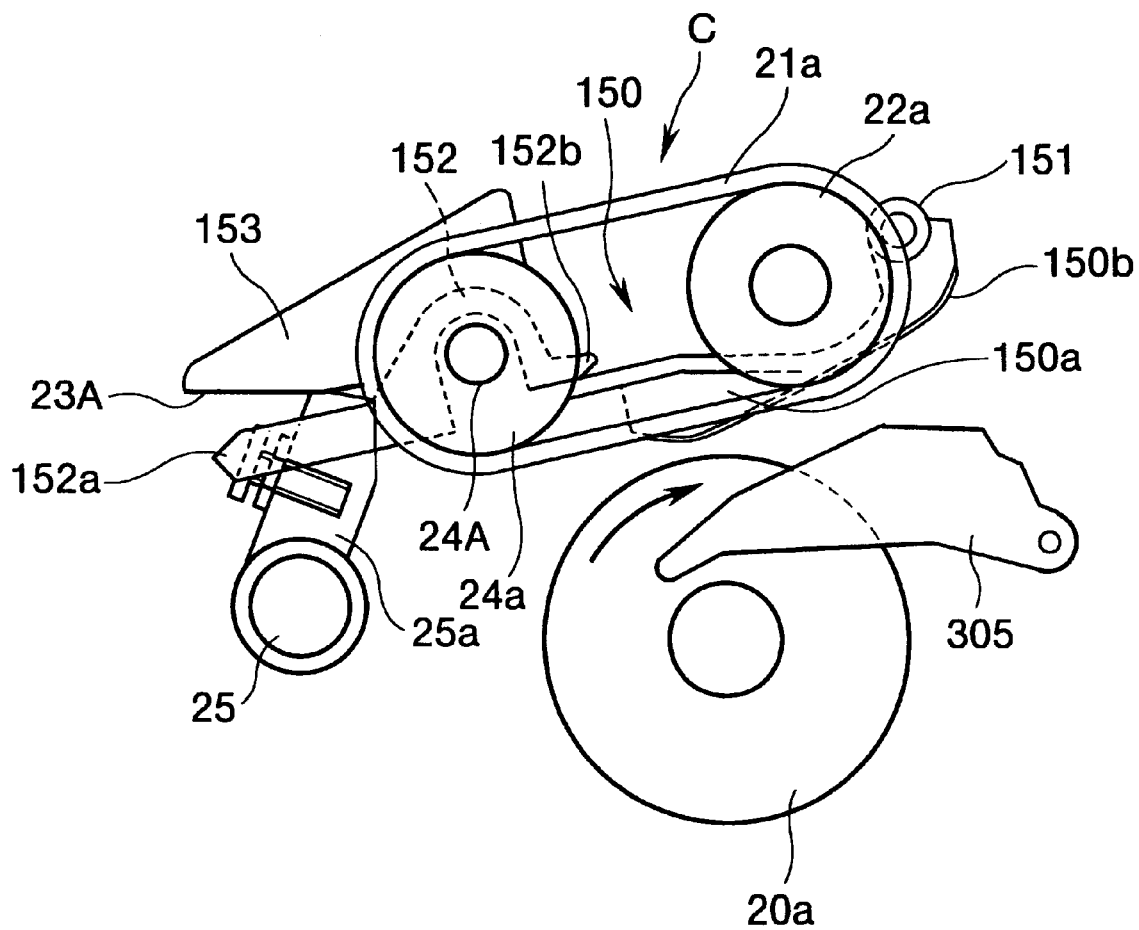
FIG. 19 is a view showing an upper separation condition of the separation portion.

When the separation guide cam is engaged by the separation guide 150, the separation guide 150 is rocked upwardly around the support portion 151, with the result that, as shown in FIG. 19, the separation guide is separated from the original and the separation roller 20a. Incidentally, in the lower separation, as shown in FIG. 17, the separation guide 150 is rocked downwardly around the support portion 151 by its own weight to be contacted with the original and the separation roller 20a.

In FIG. 17, a belt pulley cam 153 has a lower surface on which a positioning surface 23A is formed. As mentioned above, in the upper separation, when the cam shaft 25 is rotated in the anti-clockwise direction, the belt pulley cam is lifted by the first cam 25a of the cam shaft 25 to separate the separation belt 21a from the separation roller 20a as shown in FIG. 19.

What is claimed is:

1. An automatic original supplying apparatus in which originals are stacked on an original tray as an original bundle, and the originals in the original bundle are separated one by one from an uppermost one or from a lowermost one by a separation portion, which supplies the originals one by one by frictional operation of a rotary means selectively acting upon the originals from above or below and which is disposed at one side of said original tray, comprising:

a guide passage for directing the original bundle to said separation portion; and a guide member provided at a tip end of said guide passage for upward and downward pivotal movement so that, when the originals are separated from the uppermost one, said guide member is rocked upwardly to protrude upwardly from said guide passage in an inclined fashion to thereby guide a tip end of the original bundle to be directed to said separation portion, and when the originals are separated from the lowermost one, said guide member is rocked downwardly to be retracted from said guide passage.

2. An automatic original supplying apparatus according to claim 1, wherein the rotary means of said separation portion comprises a pair of upper and lower rotary members that move toward each other in an upper separation and move away from each other in a lower separation and a pair of upper and lower rotary members that move away from each other in the upper separation and move toward each other in the lower separation, and wherein a rocking position of said guide member is determined by shifting movements of said rotary members.

3. An automatic original supplying apparatus according to claim 1, wherein the rotary means of said separation portion has a reversible separation/supply rotary member which can be rotated in a normal direction or a reverse direction in response to a normal rotation or a reverse rotation of a motor, and a rocking direction of said guide member is determined by the rotational direction of said motor.

4. An automatic original supplying apparatus according to claim 2 or 3, wherein the rotary members can be overlapped in a comb fashion in an up-and-down direction and can be spaced apart from each other, and said guide member can be protruded between said rotary members.

5. An automatic original supplying apparatus according to claim 1, wherein the rotary means of said separation portion comprises first sheet convey means and second sheet convey means selectively rotated in a sheet convey direction or a reverse direction opposite thereto; and third sheet convey means and fourth sheet convey means which can be contacted with and separated from said first and second sheet convey means and which are rotated in directions opposite to rotational directions of said first and second sheet convey means;

wherein, when said first sheet convey means is rotated in the sheet convey direction, said third sheet convey means forms a nip between it and said first sheet convey means and is rotated in the reverse direction, and said fourth sheet convey means is separated from said second sheet convey means; and when said second sheet convey means is rotated in the reverse direction, said fourth sheet convey means forms a nip between it and said second sheet convey means and is rotated in the sheet convey direction, and said third sheet convey means is separated from said first sheet convey means.

6. An automatic original supplying apparatus according to claim 5, further comprising a reversible motor, and wherein said third and fourth sheet convey means are provided on a drive shaft substantially parallel with said first and second sheet convey means and driven by said motor; and further wherein when said motor is rotated in a normal direction, said third sheet convey means is set to a position where the nip is formed between said third and first sheet convey means and said fourth sheet convey means is set to a position where the nip is not formed between said fourth and second sheet convey means; and when said motor is rotated in a reverse direction, said third sheet convey means is set to a position where the nip is not formed between said third and first sheet convey means and said fourth sheet convey means is set to a position where the nip is formed between said fourth and second sheet convey means.

7. An automatic original supplying apparatus according to claim 6, further comprising a first shift means for positioning said third and fourth sheet convey means, and wherein the change in positions of said third and fourth sheet convey means corresponding to the normal and reverse rotations of said motor is effected by changing the phase of said first shift means, and the change in the phase of said first shift means is effected by a driving force of said motor.

8. An automatic original supplying apparatus according to claim 7, wherein said first shift means is a cam member.

9. An automatic original supplying apparatus according to claim 8, further comprising a second shift means for positioning said guide member, and wherein the change in position of said guide member corresponding to the normal and reverse rotations of said motor is effected by changing the phase of said second shift means, and the change in the phase of said second shift means is effected by a driving force of said motor.

10. An automatic original supplying apparatus according to claim 9, wherein said second shift means is a cam member.

11. An automatic original supplying apparatus according to claim 1, wherein a contact portion of said guide member contacted with the original has a coefficient of friction greater than a coefficient of friction between the originals so that the originals in the original bundle can be deviated one by one from an uppermost one.

12. An automatic original supplying apparatus according to claim 11, wherein a resisting member having a coefficient of friction greater than the coefficient of friction between the originals is adhered to or coated on said contact portion of said guide member.

13. An automatic original supplying apparatus according to claim 11, wherein said contact portion of said guide member is surface-finished so that said contact portion has a coefficient of friction greater than the coefficient of friction between the originals.

14. An image forming apparatus having an automatic original supplying apparatus for supplying an original to an original reading portion, and an image forming portion for forming an image on a sheet in accordance with the original supplied by said automatic original supplying apparatus,
   wherein said automatic original supplying apparatus is an automatic original supplying apparatus according to one of claims 1 to 13.

15. An original supplying apparatus according to claim 1, wherein the rotary means of the separating portion has an upper rotary belt member and a lower roller rotary member rotating reversely upon separation of the sheets from the uppermost sheet.

16. An automatic original supplying apparatus according to claim 1, further comprising
   an original separation aiding member provided at a tip end of said guide passage for upward and downward pivotal movement so that, when the originals are separated from the uppermost one, said aiding member is rocked upwardly to be retracted from said guide passage, and when the originals are separated from the lowermost one, said aiding member is rocked downwardly to protrude downwardly from the guide passage in an inclined fashion to thereby handle the original bundle.

17. An automatic original supplying apparatus according to claim 16, wherein said rotary means comprises a pair of upper and lower rotary members moved toward each other in the upper separation and are moved away from each other in the lower separation and a pair of upper and lower rotary members moved away from each other in the upper separation and are moved toward each other in the lower separation, and wherein a rocking position of said aiding member is determined by shifting movements of said rotary members.

18. An automatic original supplying apparatus according to claim 17, wherein a contact portion of said original separation aiding member contacted with an upper surface of the original bundle has a coefficient of friction smaller than a coefficient of friction of said rotary member contacted with the lowermost original so that the originals can be separated from the lowermost one.

19. An automatic original supplying apparatus according to claim 16, wherein said rotary means has a reversible separation/supply rotary member which can be rotated in a normal-direction or a reverse direction in response to a normal rotation or a reverse rotation of a motor, and a rocking direction of said aiding member is determined by the rotational direction of said motor.

20. An automatic original supplying apparatus according to claim 16, wherein a contact portion of said original separation aiding member contacted with the original has a coefficient of friction greater than a coefficient of friction between the originals so that the originals in the original bundle can be deviated one by one from the uppermost one.

21. An automatic original supplying apparatus according to any one of claims 16 to 18, wherein the rotary means can be overlapped in a comb fashion in an up-and-down direction and can be spaced apart from each other, and said aiding member can be protruded between said rotary means.

22. An automatic original supplying apparatus in which an original bundle is stacked on an original tray to be separated one by one from an uppermost sheet or from a lowermost sheet by a separation portion including a pair of upper and lower rotary members and disposed at one side of said original tray,
   characterized by
   a guide member provided rockably in an up/down direction, said guide member, when separating the originals from the uppermost one, rocking upwardly to be sloped upwardly so that at least a part thereof protrudes from the lower rotary member thereby guiding up a tip end of the original bundle to be introduced to the separating portion; and said guide member, when separating the originals from the lowermost one, rocking downwardly to be retracted from the lower rotary member.

23. An original supplying apparatus according to claim 22, wherein the upper rotary member is a belt and the lower rotary member is a roller.

24. An original supplying apparatus according to claim 22, wherein the pair of upper and lower rotary members of said separating portion includes a first pair of upper and lower rotary members and a second pair of upper and lower rotary members, said first pair of rotary members have an upper belt and a lower roller moving in a first direction upon separating the originals from the uppermost one and moving in a second direction upon separating the originals from the lowermost one, said second pair of rotary members have an upper belt and a lower roller moving in the second direction upon separating the originals from the uppermost one and moving in the first direction upon separating the original from the lowermost one, and rocking of said guide member is associated with shift of said first/second pair of rotary members.

25. An original supplying apparatus according to claim 22, wherein the pair of upper and lower rotary members of the separating portion has a separation supply rotary member a normal/reverse rotation of which can be switched in response to switching of rotational direction of a motor, and a rotated shift of said guide member is provided in response to the switching of motor rotating direction.

26. An automatic original supplying apparatus in which an original bundle is stacked on an original tray to be separated one by one from an uppermost original or from a lowermost original at a separating portion including a pair of upper and lower rotary members disposed at one side of the original tray, characterized by,
   guide means a sloped state of which is switched in response to switching of the original separation from an uppermost original or a lowermost original, said guide means forming a slope for guiding a tip end of the original bundle to the upper rotary member rotating for feeding the original when separating the originals from the uppermost one, and said guide means releasing the slope when the original separation is switched to the lowermost one.

27. An original supplying apparatus according to claim 26, wherein said guide means is a guide member rocking at a tip end of the original tray to assume a sloped state and a released state.

28. An automatic original supplying apparatus according to claim 26, wherein said guide means comprises:
   a pair of upper and lower rockable guide members for forming a guide passage for directing the original bundle to said separation portion; and
   a pair of upper and lower pre-separation members which can be protruded into said guide passage and which can be contacted with the original bundle to cause deviation of originals in the original bundle, wherein, when the originals are separated from an uppermost one, said upper guide member is rocked downwardly to protrude said lower pre-separation member alone into said guide passage and to retract said upper pre-separation member from said guide passage, and when the originals are separated from a lowermost one, said lower guide member is rocked upwardly to protrude said upper pre-separation member alone into said guide passage and to retract said lower pre-separation member from said guide passage.

29. An automatic original supplying apparatus according to claim 26, wherein said guide means comprises:

a pair of upper and lower guide members, for forming a guide passage and a pair of upper and lower pre-separation members, said pair of upper and lower pre-separation members being rockable, and wherein, when the originals are separated from the uppermost one, said upper pre-separation member is rocked upwardly to be retracted from said guide passage so that said lower pre-separation member alone is protruded into said guide passage, and when the originals are separated from the lowermost one, said lower pre-separation member is rocked downwardly to be retracted from said guide passage so that said upper pre-separation member alone is protruded into said guide passage.

30. An automatic original supplying apparatus according to claim 26, further comprising:

a guide sloped upwardly for guiding the original bundle toward the upper rotary member of the separating portion; and a guide member provided movable in an upper/lower direction, said guide member upon separating the originals from the uppermost one moving downwardly to retract from said guide downwardly for guiding a tip end of the original bundle to be guided to the separating portion upwardly, and said guide member upon separating the originals from the lowermost one moving upwardly to protrude from said guide for guiding the tip end of original bundle downwardly.

31. An automatic original supplying apparatus according to claim 30, further comprising:

an upper guide sloped downwardly for guiding the original bundle toward the lower rotary member of the separating portion; and an upper guide member provided movable in an upper/lower direction, said upper guide member moving, upon separating the originals from the uppermost one, moving downwardly to protrude downwardly from said upper guide for guiding a tip end of the original bundle to be guided toward the separating portion upwardly, and said upper guide member moving, upon separating the originals from the lowermost one, upwardly to be retracted from said upper guide for guiding the tip end of original bundle downwardly.

32. An original supplying apparatus according to claim 26, wherein said guide means includes a first guide member which is sloped, and a second guide member moving to protrude from or to retract from the slope of the first guide member.

* * * * *

UNITED STATES PATENT AND TRADEMARK OFFICE
CERTIFICATE OF CORRECTION

PATENT NO. : 5,927,706

DATED : July 27, 1999

INVENTOR(S) : MASAKAZU HIROI ET AL.

It is certified that error appears in the above-identified patent and that said Letters Patent is hereby corrected as shown below:

COLUMN 1

Line 27, "has" should read --have--.

COLUMN 2

Line 12, "without" should read --without going--.

COLUMN 8

Line 24, "affects" should read --effect--.

COLUMN 9

Line 67, "an" should read --a--.

COLUMN 13

Line 14, "cost-down" should read --cost reduction--; and
    Line 49, "<Other" should read --¶ <Other-- and "As shown" should read --¶ As shown--.

COLUMN 17

Line 13, "1 to 13." should read --1 to 3 and 5 to 13.--.
    Line 20, "comprising" should read --comprising:--; and
    Line 61, "16 to 18" should read --16 to 20--.

UNITED STATES PATENT AND TRADEMARK OFFICE
CERTIFICATE OF CORRECTION

PATENT NO.    : 5,927,706
DATED         : July 27, 1999
INVENTOR(S)   : MASAKAZU HIROI ET AL.

It is certified that error appears in the above-identified patent and that said Letters Patent is hereby corrected as shown below:

COLUMN 18

Line 26, "have" should read --having--;
Line 36, "ber" should read --ber,--; and
Line 46, "means" should read --means,--.

Signed and Sealed this

Sixteenth Day of May, 2000

Attest:

Q. TODD DICKINSON

*Attesting Officer*         *Director of Patents and Trademarks*